United States Patent
Dent et al.

(10) Patent No.: US 7,995,973 B2
(45) Date of Patent: Aug. 9, 2011

(54) OWN TRANSMITTER INTERFERENCE TOLERANT TRANSCEIVER AND RECEIVING METHODS

(75) Inventors: Paul Wilkinson Dent, Pittsboro, NC (US); Sven Mattisson, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 447 days.

(21) Appl. No.: 12/339,726

(22) Filed: Dec. 19, 2008

(65) Prior Publication Data
US 2010/0159837 A1    Jun. 24, 2010

(51) Int. Cl.
    *H04B 1/40* (2006.01)
(52) U.S. Cl. .......................... 455/87; 375/260
(58) Field of Classification Search ............... 455/87, 455/63.1, 131, 296, 73, 67.3, 191, 1, 192.2, 455/192.3, 75, 260, 344–346
    See application file for complete search history.

(56) References Cited

U.S. PATENT DOCUMENTS

| | | | |
|---|---|---|---|
| 4,888,557 A | 12/1989 | Puckette, IV et al. | |
| 5,241,702 A | 8/1993 | Dent | |
| 5,432,522 A * | 7/1995 | Kurokami | 342/361 |
| 5,568,520 A | 10/1996 | Lindquist et al. | |
| 5,712,637 A | 1/1998 | Lindquist et al. | |
| 5,749,051 A | 5/1998 | Dent | |
| 6,370,205 B1 | 4/2002 | Lindoff et al. | |
| 6,449,320 B1 | 9/2002 | Lindoff | |
| 6,473,471 B2 | 10/2002 | Lindquist et al. | |
| 6,606,484 B1 | 8/2003 | Faulkner | |
| 6,882,868 B1 * | 4/2005 | Shattil | 455/562.1 |
| 7,046,720 B2 | 5/2006 | Lindoff et al. | |
| 7,127,211 B2 * | 10/2006 | Hildebrand et al. | 455/63.1 |
| 7,283,799 B2 * | 10/2007 | Shattil | 455/296 |
| 7,477,921 B2 * | 1/2009 | Shattil | 455/562.1 |
| 7,630,688 B2 * | 12/2009 | Zeira | 455/63.1 |
| 2004/0048576 A1 | 3/2004 | Hildebrand et al. | |
| 2005/0159124 A1 | 7/2005 | Shah | |

(Continued)

FOREIGN PATENT DOCUMENTS
FR      2898746 A1      9/2007

OTHER PUBLICATIONS
Mattisson, S. et al. "Methods and Apparatus for Suppressing Strong-Signal Interference in Low-IF Receivers" Co-pending U.S. Appl. No. 12/147,962, filed Jun. 27, 2008.

(Continued)

*Primary Examiner* — Lam T Mai
(74) *Attorney, Agent, or Firm* — Coats & Bennett, P.L.L.C.

(57) ABSTRACT

Circuits and methods are disclosed for reducing interference from transmitter leakage in a radio transceiver. An exemplary method for reducing interference from transmitter leakage in a radio transceiver comprises downconverting, filtering, and sampling a radio frequency signal comprising a desired signal and a transmitter leakage signal to obtain a sampled signal of interest. The method further comprises generating a sampled distortion signal estimate that estimates one or more distortion products of the transmitter leakage signal, such as a squared amplitude obtained from a square-law device or corresponding digital function. Further, the method comprises dividing the sampled distortion signal estimate and the sampled signal of interest into a plurality of frequency channels. Finally, for a selected number of frequency channels, the method comprises combining the sampled distortion signal estimate for a frequency channel with the corresponding sampled signal of interest for the same frequency channel to obtain interference-reduced signal samples for the frequency channel.

24 Claims, 10 Drawing Sheets

U.S. PATENT DOCUMENTS

2007/0184782 A1  8/2007  Sahota et al.

OTHER PUBLICATIONS

Dent, P. W. et al. "Methods and Apparatus for Reducing Own-Transmitter Interference in Low-IF and Zero-IF Receivers." Co-pending U.S. Appl. No. 12/163,248, filed Jun. 27, 2008.

Dent, P. W. et al. "Strong Signal Tolerant OFDM Receiver and Receiving Methods." Co-pending U.S. Appl. No. 12/339,630, filed Dec. 19, 2008.

International Search Report for PCT Application No. PCT/EP2009/058054 mailed Feb. 24, 2010.

* cited by examiner

OWN TRANSMITTER INTERFERENCE TOLERANT TRANSCEIVER AND RECEIVING METHODS

TECHNICAL FIELD

The present invention relates generally to wireless transceiver systems, and in particular relates to methods and apparatus for suppressing interference to received signals in such transceivers caused by non-linear distortion products of the transceiver's transmitted signals.

BACKGROUND

In the field of radio receivers, there is a continuing effort to minimize the amount of tuned circuitry used. By reducing the number of tuned circuits, larger portions of the receiver may be integrated, resulting in smaller, and often less expensive, devices. This effort has resulted in widespread interest in homodyne receivers (also known as direct-conversion receivers) and low intermediate frequency (low-IF) or near-zero intermediate frequency (near-zero IF) receivers.

A well-known and common deficiency of some prior art homodyne and low-IF receivers is susceptibility to strong interfering signals. A typical front-end circuit for a radio receiver includes a filter just after the antenna input, with a bandwidth that is often significantly larger than the signal bandwidth for a given signal of interest. As a result, the signal admitted by the antenna bandpass filter may comprise one or more unwanted signals as well as the wanted signal. The unwanted signals may generate intermodulation products, among themselves and with local oscillator leakage signals appearing at the receiver input, due to square-law and higher-order distortion terms in the receiver's radio frequency (RF) circuitry. The intermodulation products may produce corrupting interference in the complex baseband signals.

Those skilled in the art will appreciate that potentially interfering signals may appear at the receiver across a spectrum extending over the total bandwidth of the receiver's RF filter or filters. Second-order (and various higher-order) intermodulation products from these signals may thus overlap the desired downconverted signal when the intermediate frequency is less than the antenna bandwidth. In the case of a homodyne or zero-IF receiver, these interfering signals may manifest themselves as a varying DC offset, which is not easily compensated by the various means commonly employed to compensate a constant DC offset. A varying DC offset is most pronounced when interfering signals are amplitude modulated, or of a bursty type, such as with time-domain multiple access (TDMA) transmissions.

A particular source of amplitude-modulated interfering signals considered herein are the signals produced by a radio transceiver's transmitter signal. This type of self-interference is present in transceivers where signals are simultaneously transmitted and received. Because a typical duplexing filter, designed to isolate the transmitter from the receiver, has limited attenuation in its stop-band, a transmitter signal can leak through or around the duplexer even when the transmitter signal spectrum is well outside the nominal bandwidth of the receiver filter. When the transmitter signal is not a constant envelope signal, but comprises amplitude modulation components, it can cause additional interference of the type described above, resulting in, for example, varying DC offset. Of course, the use of radio frequency signals comprising amplitude modulation components is becoming increasingly prevalent in wireless standards, such as those employing OFDM protocols.

The following patents issued to one of the present inventors disclose compensation of DC offset in homodyne receivers, as well as addressing other practical deficiencies such as slope and other slow drifts: U.S. Pat. No. 5,241,702 to Dent, issued Aug. 31, 1993, entitled "DC Offset Compensation in a Radio Receiver"; U.S. Pat. No. 5,568,520 to Lindquist and Dent, issued Oct. 22, 1996, entitled "Slope, Drift and Offset Compensation in Zero-IF receivers"; U.S. Pat. No. 5,712,637, issued Jan. 27, 1998, a divisional of the above '520 patent; and U.S. Pat. No. 6,473,471, issued Oct. 29, 2002, also a divisional of the above.

Various other patents disclose compensation techniques for DC offsets, including varying DC offsets, in a homodyne receiver. These patents include several issued to Lindoff et al.: U.S. Pat. No. 6,370,205 entitled "Method and Apparatus for Performing DC-Offset Compensation in a Radio Receiver," issued Apr. 9, 2002; U.S. Pat. No. 6,449,320 entitled "Equalization with DC Offset compensation," issued Sep. 10, 2002; and U.S. Pat. No. 7,046,720, entitled "System and Method for DC Offset Compensation in a WCDMA Receiver," issued May 16, 2006.

In addition, U.S. Pat. No. 5,749,051, issued to current inventor Dent on May 5, 1998 and entitled "Compensation for Second Order Intermodulation in a Homodyne Receiver," discloses compensating varying DC offsets caused by strong signals in a homodyne receiver.

All the above mentioned patents are hereby incorporated by reference herein.

As noted above, a particular source of strong interfering signals in some wireless transceivers is the transceiver's own transmitter. For example, in CDMA-based wireless communications standards such as UMTS, also known as Wideband-CDMA (WCDMA) or 3G, as well as in the $2^{nd}$-generation CDMA systems commonly known as IS-95, all of which use simultaneous transmission and reception of signals, a transceiver's receiver and transmitter are generally connected to a shared antenna via a duplexing filter. The duplexing filter, or duplexer, typically includes a transmitter filter that suppresses receiver noise generated in the transmitter and prevents it reaching the common antenna. The duplexer's receiver filter suppresses the transmit signal and prevents it reaching the receiver where it could cause overload.

However, small duplexing filters have a limited amount of stop-band attenuation, often of the order of 40-45 dB, and thus the signal reaching the receiver radio frequency (RF) amplifier is still significant. The RF amplifier amplifies the transmitter leakage signal to an even higher level, potentially to a level that can cause distortion effects in the following mixer. As a result, conventional transceivers often include a second filter between the RF amplifier and mixer to suppress the amplified transmit leakage signal. However, as cell phones and other wireless devices are required to operate in more and more frequency bands, the proliferation of filters adds size and cost. There is therefore a need to improve a receiver's tolerance of transmit leakage to allow simplification of receiver filtering.

SUMMARY

The inventive circuits and methods disclosed herein compensate for distortion of a received signal in a low-IF or homodyne receiver caused by interactions between transmitter leakage signals and non-linearities in wideband receiver circuitry. In some embodiments of the inventive circuits disclosed herein, a distortion estimation unit comprises non-linear circuitry configured to approximate one or more non-linear response characteristics of a downconverter circuit used to downconvert the received radio frequency signal. One or more non-linear products produced by the non-linear circuit are filtered, using a filter or filters substantially similar to those used for filtering a downconverted signal that includes the desired signal and one or more non-linear distortion products of the transmitter leakage. After dividing the sampled signal of interest and the sampled distortion signal estimate into a plurality of frequency channels, the sampled distortion signal estimate for a frequency channel is then combined with the sampled signal of interest for the same frequency channel in an interference subtraction unit to obtain interference-reduced signal samples for that frequency channel. This process is performed for each of a selected number of frequency channels. In some embodiments, the selected number of frequency channels comprises all of the plurality of frequency channels. In other embodiments, the selected number of frequency channels comprises a subset of frequency channels including fewer than the plurality of frequency channels.

In some embodiments, the sampled distortion signal estimate for each of the selected number of frequency channels is scaled, using a scaling factor adapted for the each of the same frequency channels, and subtracted from the corresponding sampled signal of interest for the each of the same frequency channels to obtain reduced-interference signal samples for each of the selected number of frequency channels. In some embodiments, a scaling factor is determined by correlating the sampled signal of interest for a frequency channel with the sampled distortion signal estimate for the same frequency channel.

An exemplary method for reducing interference from transmitter leakage in a radio transceiver thus comprises downconverting, filtering, and sampling a radio frequency signal comprising a desired signal and a transmitter leakage signal to obtain a sampled signal of interest. Conventional homodyne or superheterodyne downconverters may be employed. The method further comprises generating a sampled distortion signal estimate that comprises one or more distortion products of the transmitter leakage signal, such as a squared amplitude obtained from a square-law device (or, more generally, a device having a non-linear characteristic) or corresponding digital function, and dividing each of the sampled signal of interest and the sampled distortion signal into a plurality of frequency channels. Finally, the method comprises combining the sampled distortion signal estimate for each of the selected number of frequency channels with the corresponding sampled signal of interest for each of the same frequency channels to obtain interference-reduced signal samples for each of the selected number of frequency channels. In some embodiments, the combining step may comprise correlating the sampled distortion signal estimate for each of the selected number of frequency channels with the corresponding sampled signal of interest for each of the same frequency channels to determine a scaling factor for each of the selected number of frequency channels, scaling the sampled distortion signal estimate for each of the selected number of frequency channels with the corresponding scaling factor derived for each of the same frequency channels, and subtracting the scaled distortion signal estimate for each of the selected number of frequency channels from the corresponding sampled signal of interest for each of the same frequency channels to obtain the interference-reduced signal samples for each of the selected number of frequency channels.

Several variants of a transceiver for reducing interference from intermodulation distortion in a receiver are disclosed. In general, the transceiver comprises a receiver unit, configured to downconvert, filter, and sample a radio frequency signal comprising a desired signal and a transmitter leakage signal to obtain a sampled signal of interest. Various embodiments of the transceiver further comprise a distortion estimation unit configured to generate a sampled distortion signal estimate comprising one or more distortion products of the transmitter leakage signal. In addition, various transceiver embodiments comprise first and second transform units to divide the sampled signal of interest and the sampled distortion signal estimate, respectively, into a plurality of frequency channels. Finally, several of the inventive transceivers disclosed herein further comprise an interference subtraction circuit configured to combine the sampled distortion signal estimate for each of the selected number of frequency channels with the corresponding sampled signal of interest for each of the same frequency channels to obtain interference-reduced signal samples for each of the selected number of frequency channels.

The inventive techniques disclosed herein may be applied to homodyne receivers as well as low-IF receivers. Further details and variations of the inventive techniques described herein will be appreciated by the skilled practitioner after viewing the attached figures and reading the following detailed description.

DETAILED DESCRIPTION

Figure 1:
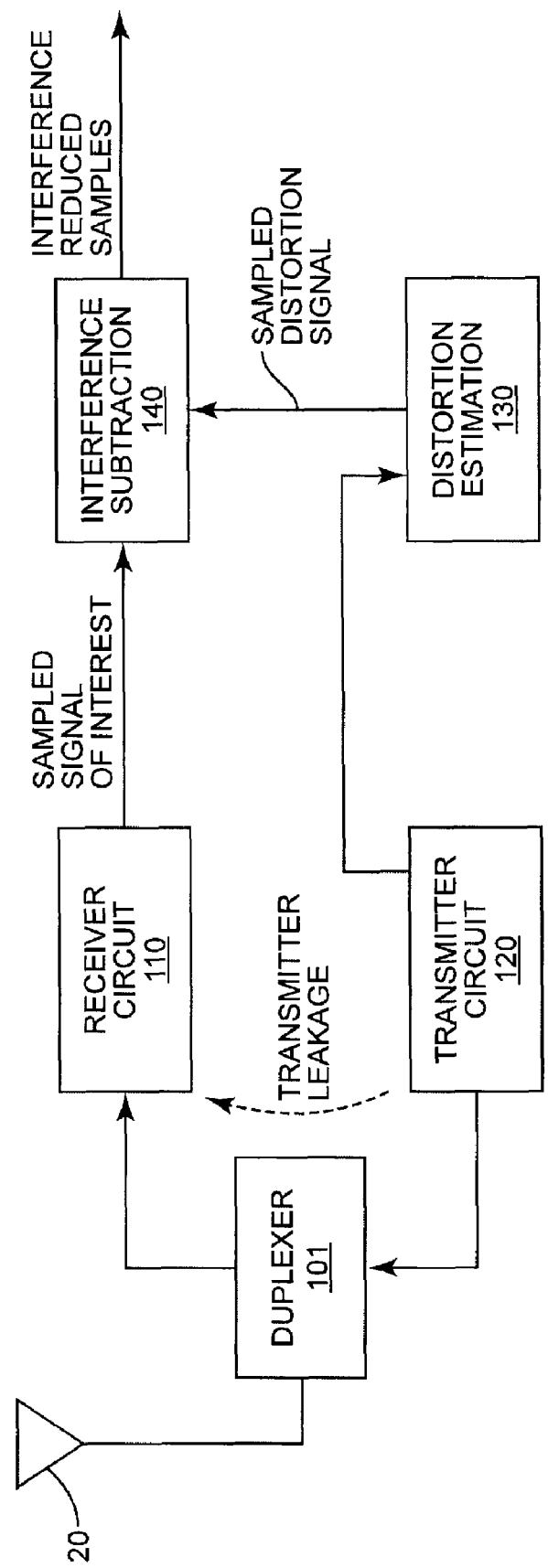
FIG. 1 is a general block diagram for a transceiver according to some embodiments of the invention.

The homodyne or direct-conversion receiver may be regarded as a variation of the traditional superheterodyne receiver. A superheterodyne receiver in general receives signals in a first frequency band and mixes the received signals with a locally generated oscillator signal, thus converting them to a second or intermediate-frequency (IF) band. By selecting the local oscillator frequency to be a constant amount away from a desired signal in the first frequency band, the desired signal always appears at the same frequency in the IF band, facilitating its selection by means of a fixed-tuned IF filter.

In the homodyne variation, the chosen "intermediate" frequency band is DC, or zero frequency. The local oscillator is then tuned to the center of the desired received signal. At the mixer output, modulation on the desired signal, which typically is manifested as spectral components above and below the desired signal center frequency, is "folded." Thus, a signal component at a frequency offset $\Delta f$ above the desired signal's center frequency or $\Delta f$ below the desired signal's center frequency will appear at the mixer output at an absolute frequency of $\Delta f$. To allow the receiver to distinguish between the folded components, quadrature downconversion may be used, where two mixers are provided, using local oscillator signals that are phase offset by 90 degrees. In this case, an upper-sideband signal component A and lower-sideband signal component B will appear in the in-phase and quadrature mixer outputs as I=A+B and Q=j(A−B), respectively. The upper-and lower-sideband components may then easily be separated by forming B=(I+jQ)/2 and A=(I−jQ)/2.

Homodyne receiver operations are described in more detail in U.S. Pat. No. 5,241,702, which was incorporated by reference above. As noted above, homodyne receivers suffer from DC-offset problems. The DC-offset problems result from the fact that the local oscillator frequency is equal to the desired reception frequency, which results in self-interference due to leakage of the local oscillator signal into the RF input of the downconversion circuit. Because the leakage signal is located precisely on the desired signal center frequency, the interfering component becomes converted to exactly zero frequency, or DC, at the downconverter outputs. The resulting DC offset component may be many orders of magnitude larger than the desired signal, and may be removed by applying the teachings of one or more of the above-referenced patents.

When at least one other strong interfering signal is present at any frequency at the input of a homodyne receiver's downconverter, the interfering signal may be converted to DC by mixing with themselves through any even order distortion terms in the polynomial description of the mixer transfer function. As will be appreciated by those skilled in the art, this effect may be minimized by employing balanced mixer structures and push-pull RF amplifier structures. These techniques generally provide cancellation of even-order distortion, of which the most significant results from the square-law term of the circuit's non-linearities, also known as second-order intermodulation. Nevertheless, signals of sufficient strength may still produce fixed or variable DC offsets due to residual second-order, or higher order, nonlinearities of the downconverter circuit, due to imperfect balance in said balanced structures. In addition, odd-order distortion terms such as the third-order term may allow mixing of at least one strong signal with itself, using the first two orders, to produce a low frequency signal, which then mixes with a local oscillator leakage signal (using the third of the three orders) to impress low frequency modulation upon the local oscillator leakage signal.

The latter mechanism is also proportional to second-order distortion between the strong interfering signals, but arises due to the third-order distortion term in the RF circuit transfer function. Such third-order non-linearities are usually smaller than second-order non-linearities, but since odd-order terms are not suppressed by using balanced or push-pull circuit structures, the third-order distortion terms may be the dominant source of interference.

For example, consider an interfering radio-frequency signal $S_U$ and a local oscillator leakage signal $S_L$, operated upon by a cubic distortion term to produce: $(S_U+S_L)^3=S_U^3+3S_U^2S_L+3S_US_L^2+S_L^3$. Those skilled in the art will appreciate that a potentially damaging term in the cubic distortion expression is $3S_U^2S_L$, because $3S_U^2S_L$ may produce an interfering signal at the local oscillator frequency, which may then be downconverted to DC. In effect, $S_U^2$ represents a square-law amplitude detection of the unwanted signal(s) $S_U$, the amplitude then modulating the local oscillator leakage $S_L$ such that it may not be treated as a constant by a DC offset compensating mechanism. In a homodyne receiver, this may be compensated using the techniques disclosed in the '051 patent.

When a low-IF receiver is used rather than a zero-IF receiver, it is not necessarily the amplitude modulation detected by the term $S_U^2$ which causes the interference, but rather a spectral component of it within the low-IF passband. Further, third-order terms resulting from two interfering signals and the local oscillator leakage may also fall within the low-IF passband. Depending on how low the IF is, the interference components may or may not be suppressed by the techniques disclosed in the '051 patent. In a related, co-pending patent application, U.S. Ser. No. 12/147,962, filed Jun. 27, 2008, and titled "Methods and Apparatus for Suppressing Strong-Signal Interference in Low-IF Receivers," the contents of which are hereby incorporated by reference herein, the present inventors describe enhancements to the techniques of the '051 patent for ensuring the compensation of such interference.

According to the teachings of this related application, the tolerance of a receiver to strong interfering signals from external sources may be improved by routing the signals to a non-linear circuit designed to mimic the non-linear mechanisms in the receiver mixer that produce interfering distortion products. The mimicked interference may then be digitized and fed to a digital signal processing circuit for subtraction from digital samples of a downconverted received signal.

In the present disclosure, an additional source for a strong interfering signal is considered: leakage of a transceiver's transmitter signal, such as leakage through and around transmit/receive duplexing filters. The transmitter signal leakage is pictured in FIG. 1, which illustrates a transceiver circuit according to some embodiments of the invention. In FIG. 1, antenna 20 is coupled to receiver circuit 110 and transmitter circuit 120 with duplexing filter 101. As noted above, the receive filter portion of duplexer 101 has less than perfect attenuation over than the transmitter frequency band. Because the transmitted signal may be quite strong (e.g., up to 1 watt in some applications), the filtered transmitter signal appearing at the receiver circuit input may be quite powerful, compared to weak received signals. The transmitter leakage signal may thus create intermodulation products in the receiver circuitry; as discussed above, some of the intermodulation products may fall on an intermediate frequency used by the receiver, or at or near zero frequency in a homodyne receiver, causing unwanted distortion of the received signal.

As in the circuits of the related application, the non-linear distortion products related to strong interfering signal(s) may be approximated, or "mimicked," using a non-linear function. This mimicking is performed in the transceiver circuit of FIG. 1 in distortion estimation circuit 130. As will be described in more detail below, the distortion estimation circuit may generate a sampled distortion signal estimate based on an analog sample of the transmitter signal, e.g., from a coupled sample of the transmitter's power amplifier output or any intermediate-frequency version of the transmitter signal. However, in some embodiments the transceiver's "knowledge" of the transmitter signal modulation may be used to simplify this mimicking, so that the mimicking of the receiver's non-linear interference mechanisms may be accomplished by a suitable digital function implemented in digital signal processing software. In this case, distortion estimation circuit 130 may simply comprise digital processing circuitry. As will be seen, the result of digital interference mimicking is a set of interference sample estimates already in the digital domain inside the digital signal processing, which may therefore be easily fed across to an interference subtraction circuit 140, which may also be implemented with digital processing logic.

Figure 2:
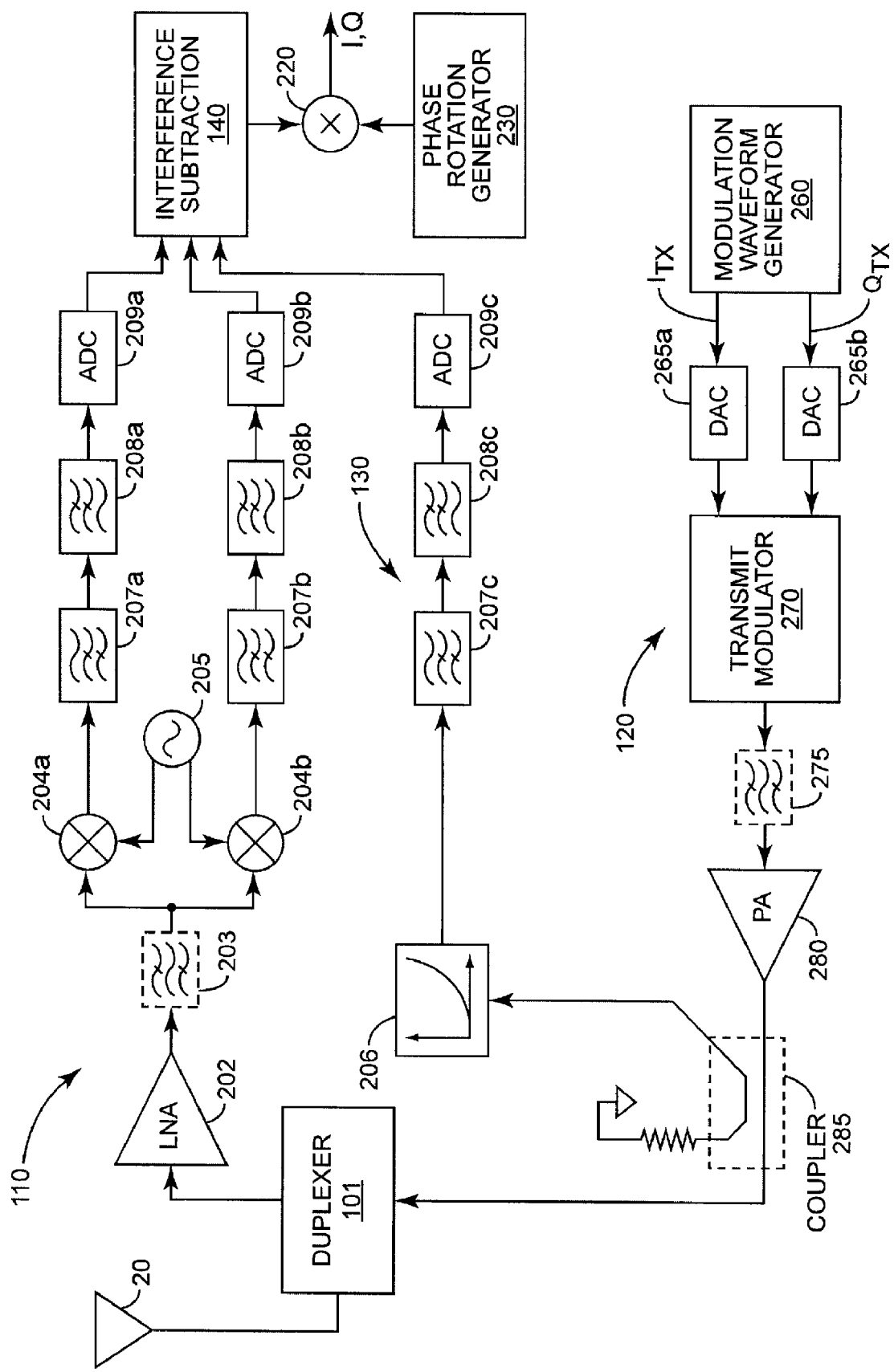
FIG. 2 provides details of exemplary transmitter circuitry, receiver circuitry, and distortion estimation circuitry according to some embodiments of the invention.

FIG. 2 provides further details of one possible implementation of transmitter signal interference compensation according to some embodiments of the present invention. Again, a transmitter section 120 and a receiver section 110 are each coupled to antenna 20 via a duplex filter 101. Although duplexer 101 in FIGS. 1 and 2 is pictured as a single unit, those skilled in the art will appreciate that the precise nature of connections between transmitter 120, receiver 110, and antenna 20 is not essential to the invention. For instance, in some embodiments, the coupling between transmitter 120, receiver 110, and antenna 20 may comprise a duplexing filter having a single, common connection to a single, shared antenna, as shown in FIGS. 1 and 2. In others, separate transmit and receive antennas may be connected separately to respective transmit and receive filters. In still other embodiments, a multiple-antenna, multi-channel receiver implementing a multiple-input, multiple-output (MIMO) communications scheme may include several antennas, any or all of which may be shared with a single-channel or multiple-channel transmitter, which may also be implementing a MIMO scheme. Thus, in the case of multi-channel receivers or transmitters, it shall be understood that several of the pictured elements of receiver 110 or transmitter 120 may be repeated. However, to simplify the present discussion, operation with a single transmitter and single receiver channel will be described.

Referring once more to FIG. 2, a received signal passes from a receive filter section of duplexer 101 to low-noise amplifier (LNA) 202. In general, the radio frequency signal at the input of LNA 202 may include a desired signal component received through antenna 20, as well as an undesired residual transmitter signal, due to the finite attenuation of duplexer 101 at the transmit frequency. The undesired transmit signal component is amplified by LNA 202 along with the desired signal component; in some systems, an additional filter, pictured in FIG. 2 as optional filter 203, may be included to further suppress the transmitter leakage signal to avoid overloading subsequent circuitry, such as downconverter mixers 204a and 204b. However, in some embodiments, the techniques disclosed herein may simplify the receiver filtering requirements, in some cases to the point where filter 203 may be omitted. As will be appreciated by those skilled in the art, omitting filter 203 may be particularly desirable when the wireless device, e.g. a cell phone, operates in several transmit and receive frequency bands.

In any event, in FIG. 2 the amplified radio frequency signal, which includes an undesired transmitter signal component as well as a desired received signal component, is converted to in-phase and quadrature intermediate frequency (IF) signals, using mixers 204a and 204b driven by quadrature voltage-controlled oscillator (QVCO) 205. Those skilled in the art will appreciate that QVCO 205 may be controlled by a tunable frequency synthesizer, allowing the receiver to be tuned to any of several pre-determined channels. In a homodyne, the local oscillator signal from QVCO 205 would be tuned to the carrier frequency of the desired signal. However, the radio transceiver circuit of FIG. 2 may represent a heterodyne receiver, where the local oscillator frequency is not coincident with the carrier frequency or center of the wanted signal channel, but is instead offset by a frequency offset equal to the desired intermediate frequency. Those skilled in the art will appreciate that a common offset used for low-IF receivers for receiving frequency-multiplexed channels is one-half the channel spacing (i.e., one-half of the frequency separation between adjacent channels in the frequency-multiplexing scheme), which places the local oscillator just outside the signal spectrum on one edge of the desired channel or the other. Of course, the local oscillator frequency and intermediate frequency may be selected based on other offsets as well.

In the heterodyne receiver of FIG. 2, the in-phase and quadrature IF signals from mixers 204a and 204b are filtered, using high-pass filters 207a and 207b, and low-pass filters 208a and 208b. As was explained in more detail in the inventors' related application, this configuration may be particularly appropriate in a receiver configured for low-IF operation. When higher intermediate frequencies are employed, high-pass filters 207 and low-pass filters 208 may in some cases be replaced by a single bandpass filter. Those skilled in the art will appreciate that the filtering accomplished by filters 207 and 208 may also be distributed among other combinations of conventional filter blocks.

The filtered intermediate frequency signals are sampled and digitized in analog-to-digital converters (ADCs) 209a and 209b. After analog-to-digital conversion, the in-phase and quadrature intermediate frequency signals and the estimated distortion waveform are in the numerical domain, and in some embodiments may be collected and stored in memory for non-real-time (e.g., offline) processing by subsequent digital processing circuits, such as interference subtraction circuit 140. Of course, non-real-time processing is not essential, but is often more convenient, as the system designer need only be concerned that the entire processing is completed within the time available, and need not be so concerned about maintaining the timing between individual parts of an extended synchronous process.

Referring to the transmitter portion of the circuit of FIG. 2, a complex transmitter modulation waveform signal is generated in transmit modulation waveform generator 260. The complex samples of the transmitter modulation waveform (represented in FIG. 2 as quadrature components $I_{TX}$ and $Q_{TX}$) are converted to analog signals using digital-to-analog converters (DACs) 265a and 265b. Those skilled in the art will appreciate that in FIG. 2, the transmitter modulation waveform is represented in a Cartesian format (e.g., I-Q, or X-Y). However, other representations, which may be more suitable for particular types of modulators or particular modulation schemes, may also be used. For example, polar representations (e.g., amplitude and phase, or "r, θ") or log-polar representations (e.g., log-amplitude, or "log-r, θ") may be appropriate for a particular transceiver design.

In any case, a suitable transmit modulator 270, adapted for one or more desired modulation schemes and compatible with the selected representation, applies the modulation to a carrier signal at the desired transmit frequency. Those skilled in the art will appreciate that transmit modulator 270 may comprise any of various types of modulators, including quadrature modulators, polar modulators (e.g., envelope elimination and restoration, or EER, modulators). The details of such modulators are well known to those skilled in the art; since these details are not essential to an understanding of the invention they are not repeated here.

The modulated signal produced by transmit modulator 270 is amplified by power amplifier 280, which amplifies the transmit signal to the desired transmit power level. Although FIG. 2 illustrates a separate power amplifier 280 and transmit modulator 270, those skilled in the art will appreciate that in some implementations, particularly those using polar or log-polar modulation techniques, an amplitude modulation component may be applied to the transmitter signal via the power amplifier 280. For example, a high-level modulator may be used to modulate the supply voltage.

In some embodiments, an optional low-pass or band-pass filter 275 may be used to suppress wideband noise, which may extend over the receive frequency band and cause desensitization of the receiver. However, those skilled in the art will recognize that the wideband noise is an interference mechanism that is distinct from intermodulation distortion caused by leakage of the fundamental transmitter signal into the receiver mixers. Both effects are dealt with in respective ways to avoid loss of receiver sensitivity. While filter 275 may reduce or eliminate interference caused by transmitter signal noise falling directly into the receive band, it will have no effect on the intermodulation products related to the desired transmitter signal itself. The focus of the present disclosure is compensation for the latter interference mechanism, i.e., reducing the effects of intermodulation in the receiver caused by the desired transmit frequency signal leaking across to the receiver input of LNA 202.

Accordingly, the transceiver circuit of FIG. 2 illustrates one approach to reducing the intermodulation effects. In the pictured approach an analog sample of the transmit signal is taken, using directional coupler 285, and applied to analog non-linear function 206. Non-linear function 206 is designed to mimic one or more non-linear characteristics of mixers 204*a* and 204*b*, preferably the non-linearities that cause the dominant intermodulation distortion in the intermediate frequency signals.

A typical intermodulation mechanism involves the square-law-like non-linearity of the mixers; the square-law-like non-linearity effectively detects the amplitude modulation on the transmit signal, to produce an interfering waveform at the mixer outputs having a spectrum that may overlap the desired signal at the intermediate frequency. This particular distortion mechanism is most likely to occur when the intermediate frequency is in the range of zero to a few times the bandwidth of the modulated transmitter signal, which is a typical range for low-IF receivers. Another intermodulation mechanism is due to a cubic non-linearity of the mixers. One often troublesome source of self-interference in a zero-IF receiver is leakage of the local oscillator signal, which is tuned to the desired receive frequency, into the radio-frequency circuitry of the receiver, causing coherent interference. As is well known to those skilled in the art, local oscillator leakage may give rise to a DC offset at the outputs of the mixers. This particular problem may in many instances be handled as described in the above-referenced patents and patent applications. However, as described above, a cubic nonlinearity of the mixers may allow the square of the transmitter signal leakage (i.e., the squared amplitude) to modulate the local oscillator leakage, so that the result is not merely a DC offset, but a modulated DC offset. The modulated DC offset therefore has a varying waveform that may not be compensated by conventional DC offset compensation techniques. Furthermore, the modulated DC offset may also have a spectral spread that may affect non-zero-IF receivers, e.g., low-IF receivers.

Both of the intermodulation mechanisms described above may be seen to cause an intermodulation waveform related to the square of the transmit signal amplitude. Thus, non-linear function 206 may in some embodiments include a square-law detector, e.g., a diode or other P-N junction or FET transconductance, to mimic the intermodulation waveform.

More accurate approximations of the non-linear distortion products of mixers 204*a* and 204*b* may be obtained by characterizing the mixer performance and constructing a circuit to replicate the non-linear characteristics of the mixers 204*a* and 204*b*. The process of replicating the non-linear characteristics of the mixers 204*a* and 204*b* may begin with measuring the strong signal interference appearing at the outputs of mixers 204*a* and 204*b* and plotting the interference versus the strength of the signals on a log/log(e.g., dB/dB) scale. The slope of the resulting plot then indicates the order of the non-linearity involved. An approximation of the non-linearity may then easily be designed using non-linear components such as diodes. In some cases, it may be necessary to match both a square-law term and a cubic term in the polynomial expansion of mixer non-linearities, the square-law term being necessary to estimate the squared-amplitude signal itself, while the cubic term approximates the product of the transmitter signal with local oscillator leakage.

In some embodiments, distortion estimation circuit 130 in general, and non-linear function 206 in particular, may comprise two or more separate non-linear functions, e.g., one of which is predominantly a square-law non-linearity and another which is predominantly a cubic non-linearity. In some such embodiments, separate distortion waveform estimates may be separately processed (e.g., filtered and digitized) and then used to cancel interference to the desired intermediate frequency. In others, the separate distortion waveform estimates may be combined before further processing, to produce a multi-term approximation of the interference produced by the receiver's downconverter circuit. In the discussion that follows, an explanation of how a single non-linear interference signal is processed and subtracted is provided; those skilled in the art will recognize that the described approach may be readily applied to multiple distortion waveform estimates produced by separate non-linear functions, e.g. square-law and cubic-law functions, whether the interference estimates are processed separately or together.

In the circuit of FIG. 2, the estimated distortion waveform produced by non-linear function 206 is processed in essentially the same manner as the intermediate frequency signals produced by mixers 204*a* and 204*b*. Thus, just as the intermediate frequency signals are filtered by high-pass filters 207*a* and 207*b* to remove the unwanted DC components and higher-frequency interference products, so is the interference estimate signal from non-linear function 206 filtered, using a similar high-pass filter 207*c*. The high-pass filtering of each signal relieves the subsequent analog-to-digital converters (ADCs) 109*a*, 109*b* and 109*c* from requiring a dynamic range sufficient to encompass the DC offset component, which may in many cases dominate the signal.

All three signals, i.e., the outputs from mixers 204*a* and 204*b* and the output from non-linear function 206 may also be low-pass filtered, to remove signal components above the highest-frequency components of the desired signal spectrum. Accordingly, in some embodiments, low-pass filters 208*a*, 208*b*, and 208*c* are configured to reject signals above a cut-off frequency equal to the IF center frequency plus half the bandwidth of the desired signal. The combined response of each pair of high-pass filter 207 and low-pass filter 208 thus selects the desired signal components, as well as any interference components that spectrally overlap the desired intermediate frequency band. The low-pass filters may also allow ADCs 209a, 209b, and 209c to be operated at the lowest possible sampling frequency that meets the Nyquist sampling criterion for the desired signal bandwidth.

Those skilled in the art will appreciate that it is also possible, especially for somewhat higher intermediate frequencies, to use bandpass filters that combine the responses of each pair of high-pass filter 207 and low-pass filter 208. Further, ADCs 209a-c may in some cases be bandpass ADCs, operating at a sampling frequency less than the intermediate frequency but greater than the bandpass filter bandwidth. In some embodiments, the bandpass ADCs may be configured to sample the input analog signals at pairs of points spaced by an odd multiple of quarter-periods at the intermediate frequency, thus producing in-phase and quadrature samples. Such "quadrature sampling" is explained in more detail in, for example, U.S. Pat. No. 4,888,557, issued to Puckette et al.

It should be noted that the techniques described herein may also be applied to homodyne receiver circuits, i.e., receiver circuits where the radio frequency signal is converted to DC (or to an "intermediate frequency" of zero), as well as to superheterodyne receiver circuits where a radio frequency is converted in two (or more) successive downconverter stages to a zero-frequency or near-zero-frequency baseband. In the case of a homodyne receiver, high-pass filters 207a-c may be omitted from the circuit pictured in FIG. 2; additional circuitry for compensating for DC offsets may also be included. In transceivers where multi-stage downconversion is used, the second (and any subsequent) downconverter and filter used in the receiver may be replicated in the estimated distortion signal path as well, so that the distortion waveform estimate generated by non-linear function 206 is processed in essentially the same manner as the intermediate frequency signal in the receiver circuit.

Those skilled in the art will thus appreciate that in each of the variants of the circuit of FIG. 2 discussed above, the processing performed on the intermediate frequency signals output from mixers 204a and 204b is also performed on the output of distortion waveform generator 206. Thus, extraneous interference components appearing outside the intermediate frequency band are removed by filters 207c and 208c. Furthermore, components of the estimated distortion waveform from distortion waveform generator 206 at or near the intermediate frequency experience similar delays and frequency response as seen by the intermediate frequency signals from mixers 204a and 204b. The result of this similar conditioning of the intermediate frequency signals and the interference estimation signal is that the estimated distortion waveform approximates the interference appearing in the intermediate frequency signal as closely as possible, except for an as-yet undetermined scaling factor (and, possibly, a delay).

Figure 3:
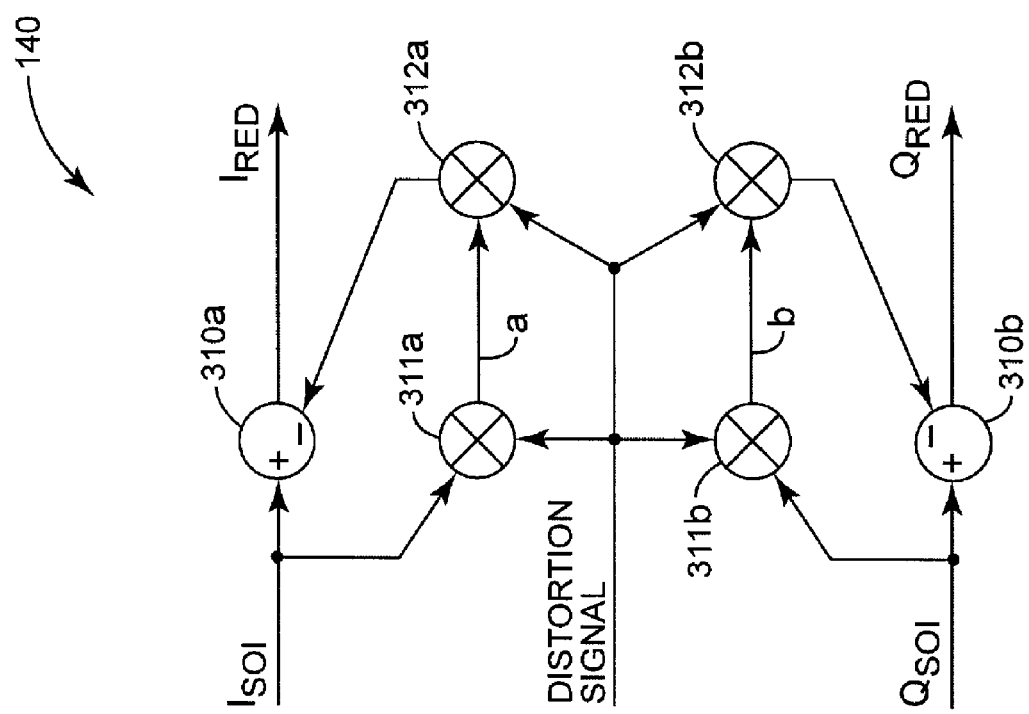
FIG. 3 illustrates details of an exemplary interference subtraction circuit.

The scaling factors may be determined by correlating the distortion signal samples from ADC 209c with the in-phase and quadrature samples of the signal of interest from ADCs 209a and 209b to determine the extent to which the distortion signal appears in the signal of interest. An exemplary signal subtraction circuit 140 is illustrated in FIG. 3, and includes correlators 311a and 311b for correlating the distortion signal samples with the in-phase and quadrature samples of the signal of interest ($I_{SOI}$, $Q_{SOI}$) respectively. Those skilled in the art will appreciate that correlators 311a and 311b may operate in various ways, but with the same objective: to determine scaling factors, illustrated as amounts a and b in FIG. 3, indicating how much of the interference signal is appearing in each of the signal paths over a predetermined averaging period.

The distortion signal samples (from ADC 209c) are then scaled by the scaling factors a and b in multipliers 312a and 312b. The scaled distortion signal samples are subtracted from the in-phase and quadrature samples of the intermediate frequency signal in subtracting circuits 310a and 310b, respectively. The resulting interference-reduced samples ($I_{RED}$, $Q_{RED}$) may be further processed to detect and decode data carried by the desired signal.

One method of correlation that may be employed by interference subtraction circuit 140 is to multiply the distortion signal samples by time-corresponding samples of the signal of interest, and summing the products over the averaging period. The resulting sum may, in some embodiments, be normalized by dividing by the number of samples used. In some embodiments of interference subtraction circuit 140, the distortion signal samples may be scaled with initial values for a and b (which may be arbitrary), and subtracted from the in-phase and quadrature signal samples, using subtracting circuits 310a and 310b. The resulting samples may then be correlated with the distortion signal samples to determine whether a residual portion of the interference signal estimate remains to be subtracted. The scaling factors a and b may then be updated to drive the residual interference component towards zero. Thus, those skilled in the art will appreciate that the subtraction circuits 310, correlating circuits 311, and scaling circuits 312 may be arranged in ways other than those illustrated in FIG. 3, while still achieving the objective of eliminating as far as possible the interference waveform defined by distortion estimation circuit 130 from the signal of interest produced by receiver circuit 110, to obtain interference-reduced samples at the outputs of interference subtraction circuit 140.

Referring once more to FIG. 2, the interference-reduced signal samples may comprise in-phase and quadrature components that together form a complex number that is rotating (on average) from one sample to the next by an angular phase of $2\pi f_{IF} \cdot \Delta T$, where $f_{IF}$ is the intermediate frequency and $\Delta T$ is the time between samples. The average phase rotation represents phase rotation induced by a carrier signal at the intermediate frequency, and may be removed by conventional phase de-rotation techniques. As shown in the circuit of FIG. 2, for example, the interference-reduced samples may be multiplied, using complex multiplier 220, by phase de-rotation samples $e^{j2\pi i/n}$ produced by phase rotation generator 230. (The value i is an integer index to successive samples, so that sample i receives an effective angular "de-rotation" of $2\pi i/n$.). In a zero-IF receiver, of course, the samples are not rotating, except to the extent there is a frequency error between the remote transmitter and the receiver. Such an error may be caused by Doppler shift, for example. In zero-IF embodiments of the present invention, complex multiplier 220 may be used to remove this accidental phase rotation, rather than the inherent rotation that occurs when a non-zero IF is used.

In some embodiments $f_{IF}$ and $\Delta T$ are conveniently selected so that $f_{IF}\Delta T$ is the reciprocal of an integer n, so that the phase rotation returns to the same point every n samples. However, this is not required; selecting $f_{IF}$ and $\Delta T$ in this manner merely simplifies the function of phase rotation generator 230 in generating the complex multiplication factor $e^{j2\pi i/n}$. In general, the reciprocal of $f_{IF}\Delta T$ is an integer if both the sample rate and intermediate frequency are selected to be integer multiples of one-half of the symbol rate. However, even if they are not closely related to a symbol rate for the desired signal, $f_{IF}\Delta T$ may still be the ratio m/n of two integers, such that the sequence also repeats after n samples. However, in this case, n may be much longer. In the limit, of course, $f_{IF}\Delta T$ may be an irrational number, in which case a phase de-rotation angle may be computed for each sample, rather than being plucked from a look-up-table.

In any case, referring once again to FIG. 2, the progressive phase rotation is removed in complex multiplier 220, where the interference-reduced signal samples, considered as a complex pair, are multiplied by the conjugate of the phase rotation factor to unwind the successive rotation. The result from complex multiplier 220 is an in-phase and quadrature (I,Q) representation of the desired signal, just as if a zero-IF or homodyne receiver had been used, except without the troublesome DC offset component. Furthermore, intermodulation components related to the transmitter signal may be substantially reduced.

In FIG. 2, phase rotation generator 230 may be clocked (indexed) using the same clock used to drive the sampling in ADCs 209a-c. Since the digital processing in the transceiver circuit of FIG. 2 may in some cases operate in non-real time, e.g., using buffered samples of the distortion signal samples and the intermediate frequency samples, this simply means that a sample index i beginning at an arbitrary point is associated with successive samples and incremented for each successive sample, for example in the I/O routine that reads samples from the ADCs into a digital processor's memory. In some embodiments, the index may also be a memory address index, assuming samples are stored sequentially in memory. However, the index used for generator 230 may be reduced modulo-n, while a memory address index is not necessarily modulo-reduced by the same modulus, depending on the size of any circular buffer used. Therefore, a separate index i, which is incremented modulo-n, may be maintained in some embodiments, and associated with successive samples.

In some embodiments, a relative delay between the distortion signal samples and the sampled signal of interest may also be determined in the digital domain. For example, several correlations may be performed, using different time-shifted versions of the signal of interest or of the distortion signal samples. The best match, e.g., the highest correlation, may be selected, or a time delay may be determined by interpolating between two of the tested time shifts. Alternatively, some embodiments may employ the subtraction of separately scaled multiple correlations, computed using different relative delay shifts between the sampled signal of interest and the distortion signal samples, to ensure matching of the total filtering in the paths traversed by the signal of interest and the estimated distortion waveform. In such embodiments, any mismatch between the filters in the paths traversed by the signal of interest and the estimated distortion waveform may be effectively corrected by an implied FIR (finite impulse response) filter that models the differences between the paths.

In the preceding discussion it was assumed that non-linear function 206 included a non-linear analog component, such as a square-law detector. However, a linear detector may be used instead. In some embodiments the square function may be formed from the detected amplitude in the digital domain, e.g., by using digital processing logic to apply a suitable numerical correcting function. One impediment to the latter approach is that the "true" interfering waveform, e.g., the square-amplitude waveform, should ideally be filtered using filters 207c and 208c having the same response as the filters 207a-b and 208a-b used to filter the intermediate frequency signal. Thus, if distortion waveform generator 206 does not mimic the exact interference waveform, e.g., if distortion waveform generator comprises a linear detector, then the effects of filters 207c and 208c may have to be transferred to the digital domain. Thus, the effects of the filters may be added to the distortion signal samples at a point where the more exact distortion signal is available, e.g., after applying the numerical correcting function. In some embodiments, the latter approach may also include sampling the output of distortion waveform generator 206 at a higher sampling rate than used at ADCs 209a and 209b, to ensure that all important spectral components are captured, if the bandwidth is no longer limited by analog filters 207c and 208c.

Those skilled in the art will appreciate that the techniques described above permit receivers to be built with intermediate frequencies that are much lower than one-half the receive bandwidth of duplexer 101, and even with intermediate frequencies less than a few times the bandwidth of the modulated transmitter signal. Further, as discussed briefly above, the techniques illustrated in FIG. 2 and described above may also be applied to homodyne, or zero-IF receivers.

In any case, those skilled in the art will appreciate that without the use of the above-described techniques, low-IF and zero-IF receivers might otherwise be susceptible to, for example, interference from intermodulation products caused by the interaction of the transmitter signal and the receiver front-end circuitry. The use of low intermediate frequencies or a zero intermediate frequency, as enabled by the techniques disclosed herein, has the advantage of permitting an earlier conversion to the digital domain, with a consequent reduction in the number of analog components, which in turn facilitates more efficient integration, and less expensive receivers.

Figure 4:
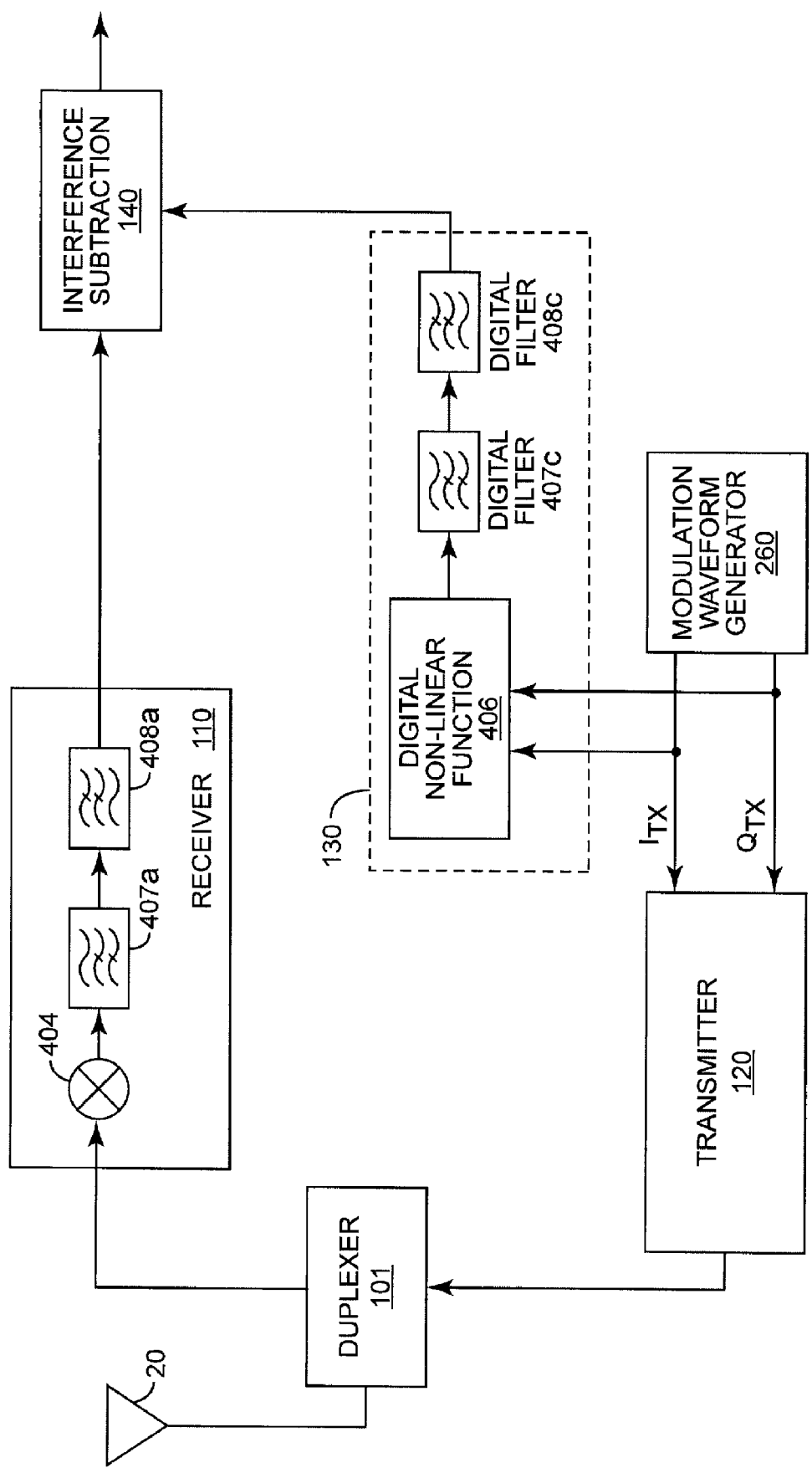
FIG. 4 is a block diagram of another transceiver circuit, according to some embodiments, including details of an exemplary distortion estimation circuit.

FIG. 4 illustrates another exemplary radio transceiver, according to some embodiments of the invention, in which the availability of the transmitter modulation signal in the digital domain is exploited to further reduce the number of analog components required to implement the general interference compensation techniques described above. Thus, in the transceiver circuit of FIG. 4, the transmitter signal is effectively sampled at baseband, by using the quadrature components of the transmitter modulation signal, $I_{TX}$ and $Q_{TX}$. As explained above, in many cases square-law distortion from the transmitter may dominate the transmitter-related interference. In such a case, only the amplitude of the transmitter modulation signal, i.e., $\sqrt{(I_{TX}^2 + Q_{TX}^2)}$, is significant in estimating the distortion waveform. Thus, the analog non-linear function 206 of FIG. 2 is replaced in the transceiver of FIG. 4 by the digital non-linear function 406.

Non-linear function 406 computes the squared amplitude of the transmitter modulation signal, $(I_{TX}^2 + Q_{TX}^2)$, which represents the distortion waveform apart from scaling factors to be determined. The effective responses of analog intermediate frequency filters 407a and 408a (which are pictured, along with mixer 404, in a simplified diagram of receiver 110) are also transferred to the digital domain, where they are implemented as digital filter functions 407c and 408c. As will be appreciated by those skilled in the art, the digital filter functions may be implemented as FIR (Finite Impulse Response) filters and/or IIR (Infinite Impulse Response) filters so as best to match the characteristics of the filtering in the desired signal path provided by filters 407a and 408a. Further, if there is a need to match a delay that is not otherwise accounted for, then such a delay may readily be built into digital filters 407c and/or 408c.

Figure 5A:
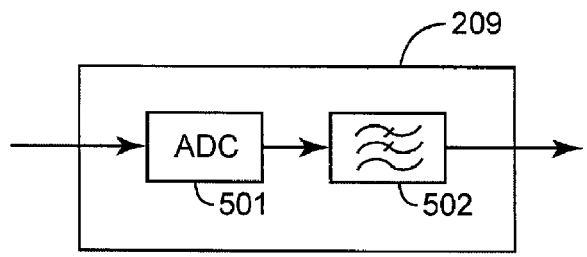
FIG. 5a illustrates an exemplary converter circuit, including a filter.

In some embodiments, the sampled signals of interest may also be processed with an additional digital element, such as a low-pass filter. For example, FIG. 5a illustrates details of an exemplary ADC converter circuit 209, which may include a converter element 501 followed by a low-pass filter 502. Referring once more to the transceiver of FIG. 4, those skilled in the art will appreciate that the effects of the additional filter 502 may also be included in the path taken by the distortion signal samples, along with digital filters 407c and 408c, with the object of ensuring that an accurate match is maintained between total filtering of the distortion signal estimate and total filtering in the desired signal path.

As briefly discussed above in connection with FIG. 2, ADC 209c (which converts an analog distortion waveform estimate to digital form) may be configured in some embodiments to sample the estimated distortion waveform from non-linear function 206 at a higher rate if any part of filtering 207c and 208c is transferred to the digital domain, for example, when part of the non-linear function is implemented digitally. As noted, this is due to the possibility that the interference signal may have a wider bandwidth if not limited by analog filters 207c and 208c prior to ADC conversion.

Similar considerations apply to the transceiver implementation pictured in FIG. 4. In such transceivers, the transmitter modulation signal $I_{TX}, Q_{TX}$ may be generated digitally at an over-sampled rate, e.g., four times or 8 times the Nyquist rate for the desired transmitter signal bandwidth. Oversampling may be done to ease the requirements on smoothing and anti-aliasing filters in the modulator included in transmitter circuit 120. Those skilled in the art will appreciate that any such filters may also be modeled by distortion estimation circuit 130, for example, by applying a digital approximation to the smoothing and anti-aliasing filters to the $I_{TX}, Q_{TX}$ stream prior to computing the squared amplitude (or other non-linear function). The availability of the signals $I_{TX}, Q_{TX}$ at an over-sampled rate, which may be preserved throughout any digital approximation of the anti-aliasing filters, satisfies the need for distortion signal samples to be available prior to filters 407c and 408c at a higher sampling rate than provided by ADCs 209a and 209b in the intermediate frequency signal path. One or both of filters 407c and 408c may then be implemented as down-sampling filters, to reproduce the same sampling rate as the signal samples provided by ADCs 209a and 209b. Thus, exploiting the availability of transmit signal samples at an over-sampled rate already in the digital domain eliminates the need for ADC 209c of FIG. 2.

Once filtered by digital filters 407c and 408c, the distortion signal samples in FIG. 4 effectively correspond to the output of ADC 209c in FIG. 2. As a result, the subsequent operations may be carried out in the same manner. Thus, interference may be subtracted from the signal of interest using a similar interference subtraction circuit 140. As described above with reference to FIG. 3, subtracting the interference may comprise determining the scaling factors a and b by means of correlators 311a and 311b, applying the scaling to the interference estimates using multipliers 312a and 312b, and subtracting the scaled interference samples from the desired signals using subtracting circuits 310a and 310b.

Figure 5B:
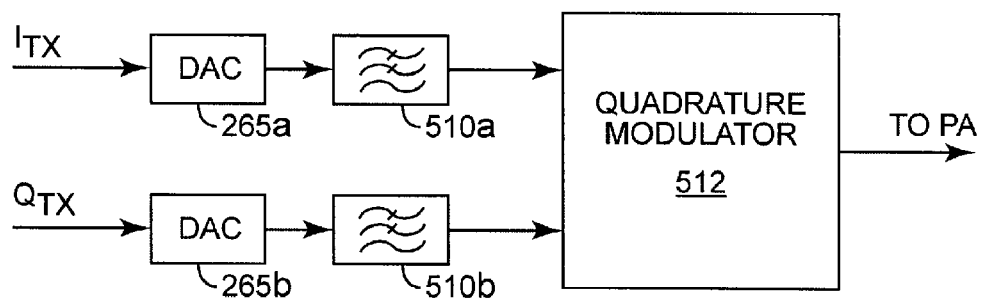
FIG. 5b illustrates an exemplary modulator circuit, including modulator filters.
Figure 5C:
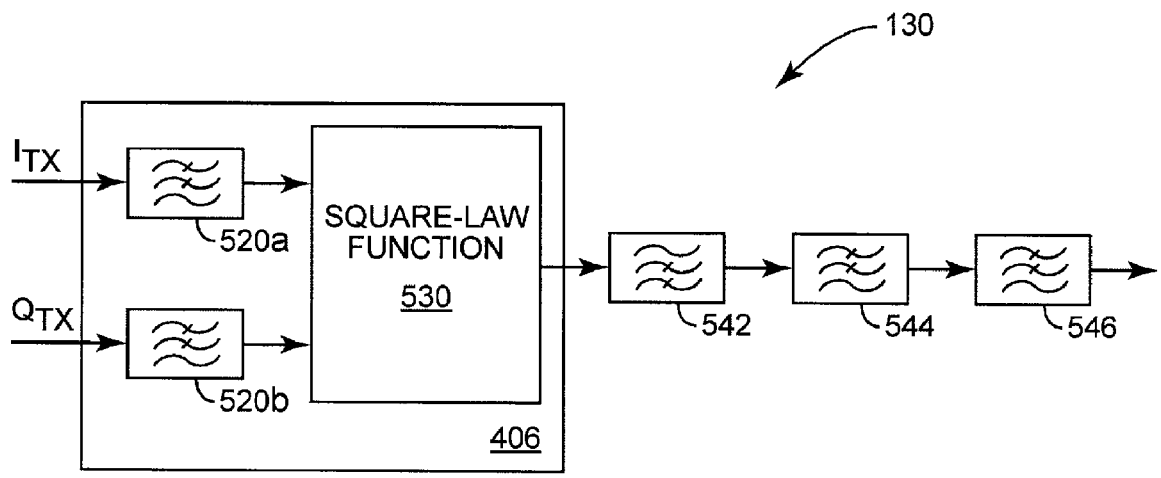
FIG. 5c illustrates an exemplary digital distortion estimation circuit, including digital filters.

FIGS. 5A-C illustrate more details on the matching of signal and interference estimate paths that may be employed in some embodiments of the present invention. As previously discussed, FIG. 5A illustrates an analog-to-digital converter 209 that includes a post-conversion filter 502. FIG. 5B illustrates internal details of a portion of a transmitter circuit, including DACs 265a and 265b, for converting over-sampled $I_{TX}, Q_{TX}$ streams from transmit modulation generator to the analog domain, followed by anti-aliasing filters 510a and 510b and quadrature modulator 512. FIG. 5B thus illustrates a Cartesian modulator, based on an I, Q representation of the transmitter modulation signal. Of course, those skilled in the art will recognize that other modulator types may be used, e.g., modulators based on polar, log-polar, or pseudo-polar representations of the transmitter modulation signal. However, the pictured circuitry illustrates how components that arise in the transmit path may be also modeled in the signal distortion estimation path. Thus, FIG. 5C illustrates details of one embodiment of a digital distortion estimation circuit 130, where the effect on the transmitter-related distortion products produced by anti-aliasing filters 510a and 510b may be replicated, or matched, with digital filters 520a and 520b in non-linear function 406, prior to calculation of the squared-amplitude samples in block 530.

Digital filters 520a and 520b and squared-amplitude calculator 530 may be configured to operate with input and output sample rates equal to the over-sampled rate of the $I_{TX}, Q_{TX}$ streams, which equals that of DACs 265a and 265b. The squared-amplitude samples from block 530 are then filtered by digital filters 542 and 544, which model the effects of analog filters 207a and 207b from the receiver of FIG. 2 (or filters 407a and 407b from FIG. 4). As noted above, digital filters 542 and 544 may operate with an over-sampled input stream, and between them may be configured to down-sample their output to the same output rate provided by intermediate frequency ADCs 209a and 209b. If additional filtering in or after ADCs 209a and 209b is provided in the processing path for the signal of interest, then corresponding filtering may be provided by digital filter 546. In FIG. 5A, an exemplary embodiment of ADC 209 includes filter 502; the response of filter 502 is thus mimicked in filter 546.

Of course, those skilled in the art will appreciate that one or several of the functional blocks of the digital distortion estimation circuit 130 pictured in FIG. 5C may be combined. For example, the responses of filters 542, 544, and 546 might be combined into a single digital filter function. Similarly, the response of digital filter 520a and 520b might be combined, in some implementations, with the digital square-law function of block 530.

The above-described equal treatment through their respective signal paths of transmit-signal-derived distortion estimates on the one hand and the desired signals on the other hand assures a high probability of good interference cancellation in interference subtraction circuit 140. If the interference mechanism is related to a different power of the amplitude than the square, or if a function deviating from the square amplitude is found empirically to match the interference mechanism more closely, then the more exact function is more easily tailored in the digital domain, as in the implementations of FIGS. 4 and 5C, than in the analog domain implementation illustrated in FIG. 2. For example, a non-linear function employing a look-up table in place of or following square-amplitude calculator 530 may be used to model any empirically determined non-linearity.

Using FIGS. 1 to 5, block diagrams illustrating various implementations of the invention have been explained by means of which strong signal interference originating from own transmitter in zero-and low-intermediate frequency radio receivers may be compensated. Of course, those skilled in the art will appreciate that the illustrations are not necessarily exhaustive, and many variations of the illustrated techniques may be employed by a person skilled in the art without departing from the scope of the invention as described by the attached claims. In particular, those skilled in the art will recognize that the techniques described herein may be applied to zero-IF, or homodyne receivers, as well as to super-heterodyne receivers. Furthermore, those skilled in the art will appreciate that various downconverter structures may be employed. For instance, some embodiments may employ an image-reject mixer for downconverting the received radio frequency signal, followed by a quadrature downconverter to zero IF or to an intermediate frequency. Some embodiments may employ bandpass samplers, operating at an intermediate frequency, configured to sample and downconvert the intermediate frequency signal to baseband at the same time. These and other variations of a downconverter circuit are described in the co-pending related application by the present inventors, incorporated by reference above. However, those skilled in the art will appreciate that the present invention is by no means limited to the particular circuit configurations described and shown herein.

Figure 6:
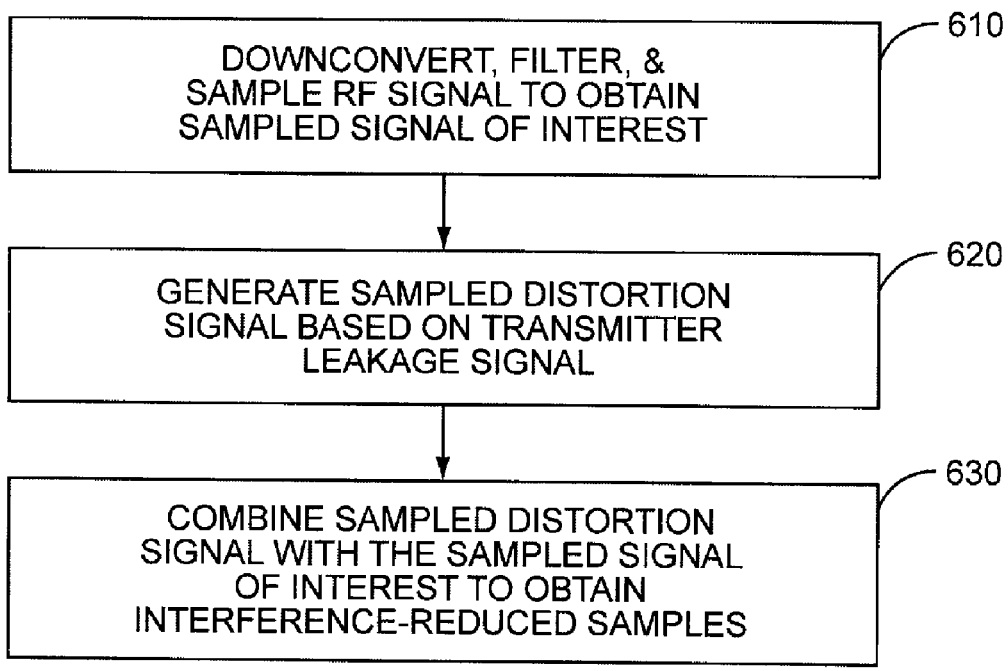
FIG. 6 is a logic flow diagram illustrating a method for reducing interference from transmitter leakage in a radio transceiver.

With this in mind, FIG. 6 illustrates an exemplary method for reducing interference caused by own-transmitter intermodulation products in a transceiver. Those skilled in the art will recognize that the method illustrated in FIG. 6 may be implemented using various embodiments of the transceiver circuits described above.

The method of FIG. 6 begins at block 610, with the downconversion of a radio frequency signal to an intermediate frequency, in the case of a superheterodyne receiver, or to baseband in the case of a homodyne receiver, followed by filtering and sampling. Those skilled in the art will appreciate that a quadrature downconverter may be used in some embodiments, in which case the intermediate frequency signal or baseband signal may comprise an in-phase part and a quadrature part. In other embodiments a single mixer may be used at this stage, or an image rejection mixer may be used, resulting in a single intermediate frequency signal. In any event, as discussed above, the radio frequency signal may comprise a transmitter leakage signal in addition to the desired signal; as a result, the resulting downconverted signal may include one or more distortion products resulting from the transmitter leakage signal.

Figure 7:
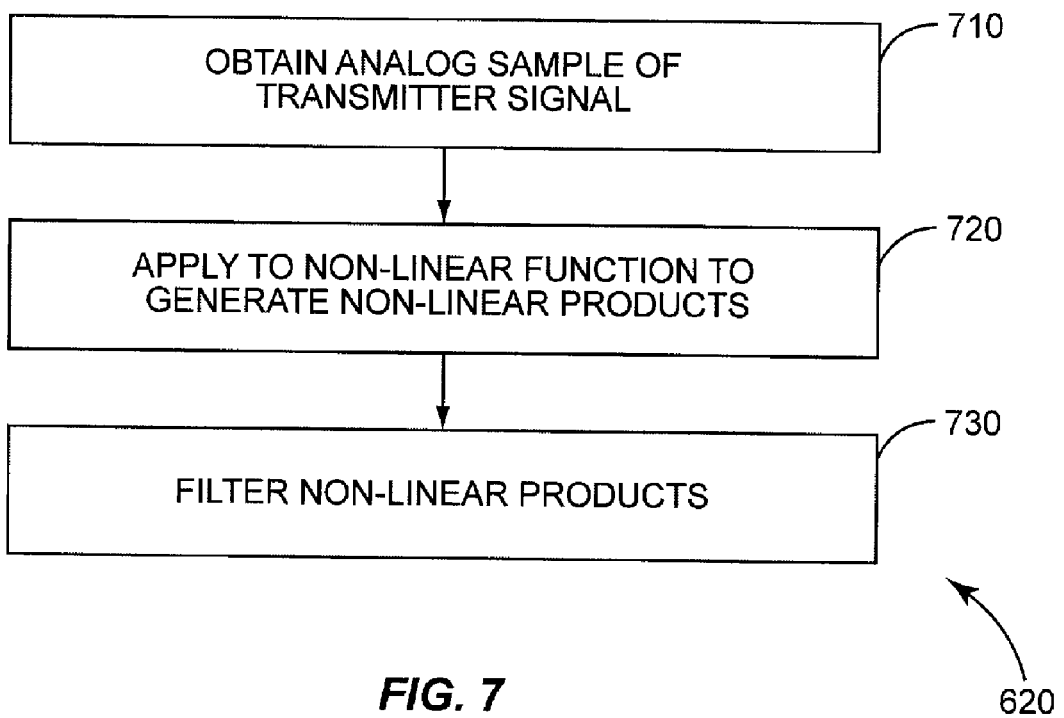
FIG. 7 illustrates a method for generating a sampled distortion signal estimate based on an analog sample of a transmitter signal.

At block 620, a sampled distortion signal estimate is generated, to approximate one or more distortion products. As was discussed above, in some embodiments, non-linear products of the transmitter signal may be generated by an analog non-linear circuit configured to approximate one or more non-linear response characteristics of the downconverter circuit. An exemplary process for generating the sampled distortion signal estimate is illustrated in the logic flow diagram pictured in FIG. 7. An analog sample of the transmitter signal is obtained at block 710 (e.g., by sampling a transmitter power amplifier output using a directional coupler), and applied to the analog non-linear circuit to generate non-linear distortion products at block 720. In the analog embodiments, the analog non-linear products may be filtered by analog filters matched to filters employed in the receiver circuits, as shown at block 730; the filtered products may then be sampled to obtain the sampled distortion signal estimate.

Figure 8:
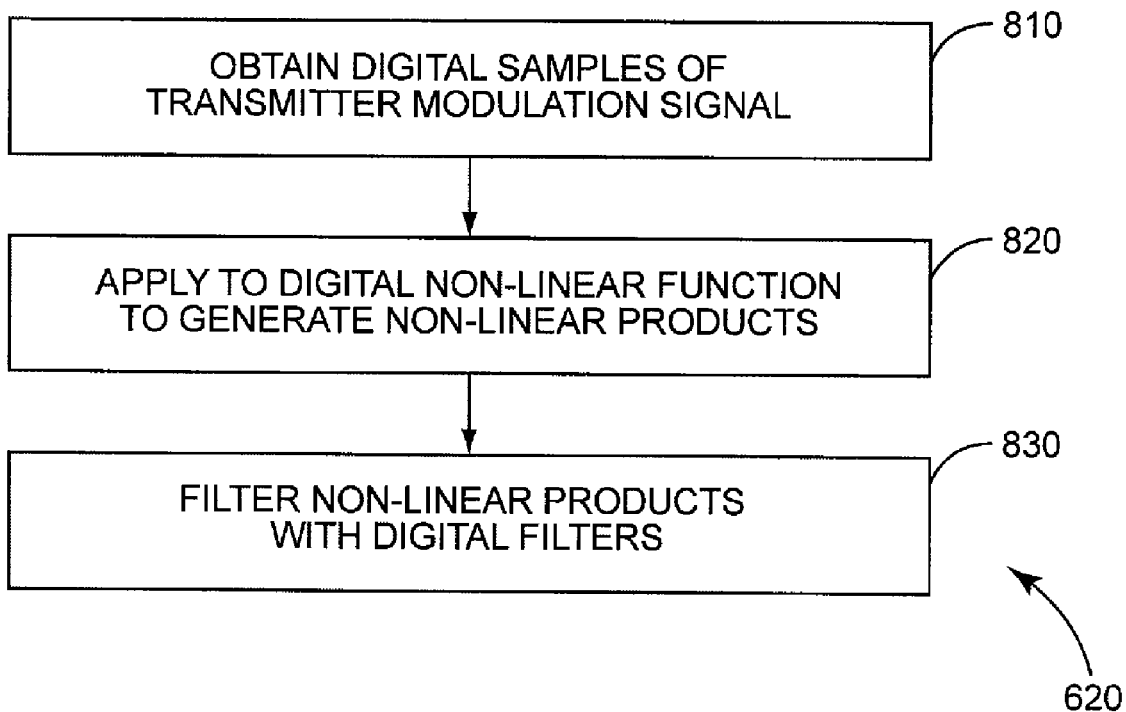
FIG. 8 illustrates an exemplary method for generating a sampled distortion signal estimate based on a digital transmitter modulation signal.

In other embodiments, a digital non-linear function may be used to transform a digital transmitter modulation signal into a sampled distortion signal estimate that mimics non-linear distortion anticipated in the downconverted signal of interest. FIG. 8 illustrates an exemplary process of using a digital non-linear function. Digital samples of the transmitter modulation signal are obtained at block 810, and applied to a digital non-linear function at block 820. The result non-linear products may be filtered, as shown at block 830, with one or more digital filters designed to replicate the effects of one or more analog filters appearing in the receiver circuit, so that the distortion signal estimate is subject to a similar frequency response and delay response as the signal of interest.

As discussed above with respect to FIGS. 1-5, in some embodiments, the non-linear circuit may comprise two or more separate non-linear functions, e.g., one that produces a square-law non-linearity and another that produces a third-order non-linearity. In other embodiments, a single non-linear circuit, e.g., a non-linear circuit that produces a dominant square-law non-linearity, may be sufficient.

Referring once more to FIG. 6, the sampled distortion signal estimate, whether obtained by analog means, digital means, or a combination of both, is combined with the sampled signal of interest to obtain interference-reduced samples, as shown at block 630. In some embodiments, the combining step may comprise determining an optimal scaling factor and/or delay for the sampled distortion signal estimate, and subtracting the scaled and/or delayed distortion signal estimate from the sampled signal of interest.

Figure 9:
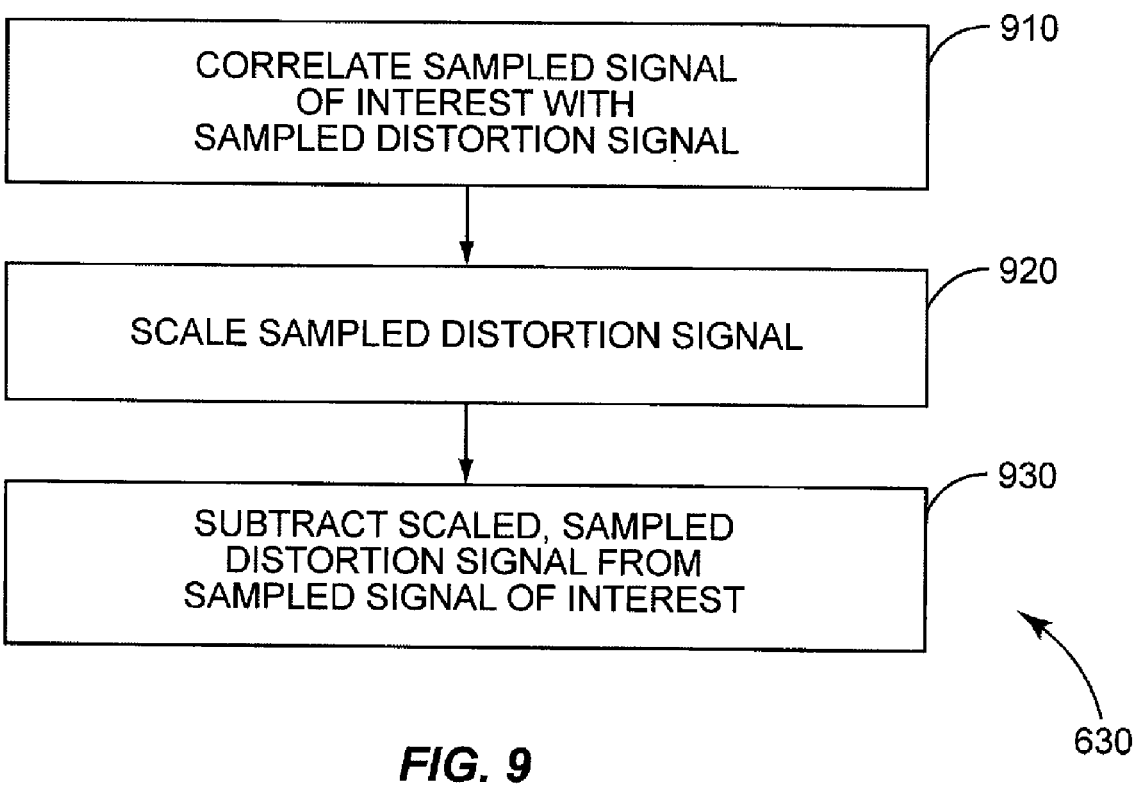
FIG. 9 illustrates an exemplary method for combining a sampled distortion signal estimate with a sampled signal of interest to obtain interference-reduced samples.

One approach for implementing the combining step in block 630 is illustrated in the logic flow of FIG. 9. At block 910, the sampled signal of interest is correlated with the sampled distortion signal estimate to determine a scaling factor to be applied to the sampled distortion signal estimate. The scaling factor is applied to the sampled distortion signal estimate at block 920. In view of the various transceiver circuits discussed above, those skilled in the art will appreciate that such scaling may comprise applying a complex scaling factor to complex samples of the distortion waveform in some embodiments of the invention. In others, a first scaling factor may be applied to the sampled distortion signal for use in reducing interference in in-phase samples of the signal of interest, while a second scaling factor is applied to the sampled distortion signal for use in reducing interference in corresponding quadrature samples of the signal of interest.

Finally, at block 930, the scaled distortion signal samples are subtracted from the sampled signal of interest to obtain interference-reduced samples. Again, considering the various circuits discussed above, those skilled in the art will appreciate that this subtraction operation may comprise a single subtraction of a single complex value from a complex signal of interest, or separate subtraction operations for each of an in-phase sample of the signal of interest and a quadrature sample of the signal of interest.

The above describes subtracting a scaled interference waveform estimate from the wanted signal waveform to reduce interference in the time domain. In order to ensure accurate cancellation, matching the interference waveform estimate to the actual interference waveform comprises ensuring that both were subjected to identical filtering operations, including the use of any digital filters such as FIR filters to process the interference waveform in the digital domain with the same filtering as the wanted signal path. Such filter matching compensates for linear waveform-altering effects.

The present invention also applies to wideband systems, e.g., Orthogonal Frequency Division Multiplexing (OFDM) systems. In a wideband system, it is possible for the receiver to convert a central frequency channel to zero frequency, while converting near-center frequency channels to a low intermediate frequency and edge frequency channels to a high intermediate frequency. Different interference mechanisms may result in different types of interference for different frequency channels, so that different frequency channels require different interference compensation, which is more difficult to describe by a digital filter such as an FIR filter. Thus, a more general, per-channel interference compensation technique is proposed herein for wideband systems. In general, both the signal of interest samples and the distortion signal samples are divided into the same equal-spaced frequency channels. A scaling factor determined for each frequency channel is used to scale the distortion signal samples for the same frequency channel for subtraction from the signal of interest samples for the same frequency channel. The following describes the invention in terms of an OFDM system, but applies equally well to any wideband system.

Figure 10:
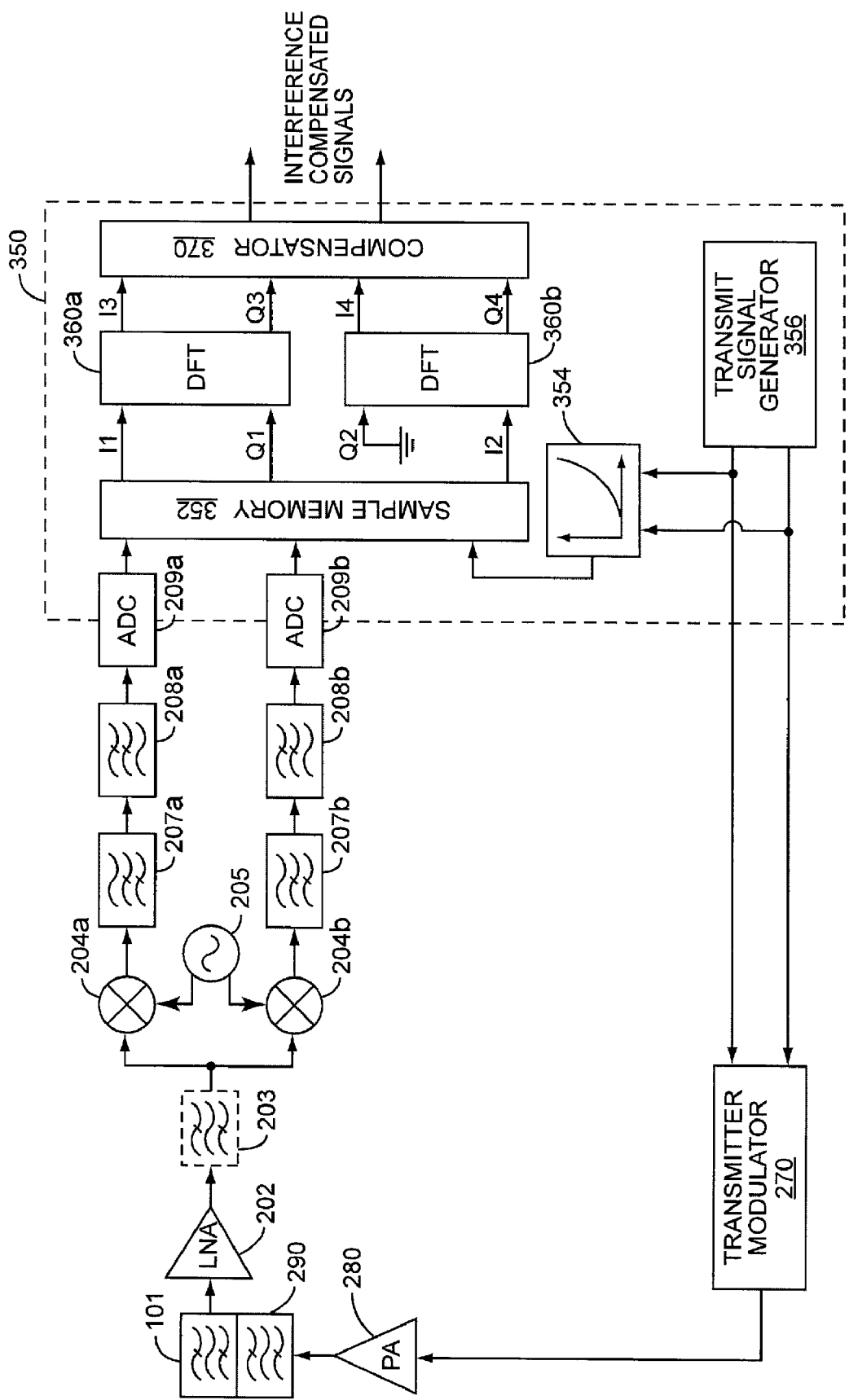
FIG. 10 illustrates one exemplary transceiver according to the present invention.

FIG. 10 illustrates one exemplary block diagram according to the present invention of an OFDM transceiver that compensates for own-transmitter interference, also referred to as transmitter leakage. The transceiver comprises a receiver chain, a transmitter chain, and a digital processor 350. As shown in FIG. 10, the digital processor 350 may include some components of the receiver and/or transmitter chain.

The receiver chain processes received signals, and includes receiver filter 201, LNA 202, optional filter 203 downconverters 204a-b, filters 207a-b and 208a-b, and ADC units 209a-b. While the following briefly states the function of each receiver chain element, it will be appreciated that the above-described details associated with the like number elements also apply to the receiver chain elements of FIG. 10. Receiver filter 201 establishes the band of receive frequencies passed to LNA 102 and suppresses own transmit signal. LNA 202 amplifies the signal provided by receiver filter 201. The amplified signal may be further filtered in optional filter 203 to further suppress own transmit signal or other unwanted signals. The filtered and amplified received signal is then downconverted using quadrature downconverters 204a-b to a processing frequency band, which may encompass zero frequency. Quadrature downconverters 204a-b mix the filtered and amplified signal with quadrature local oscillator signals from Quadrature VCO 205 to downconvert the received signal. The downconverted signals are then filtered in matched filter paths comprising filters 207a, 208a (in-phase path) and 207b, 208b (quadrature path). The filters 207a-b and 208a-b may include high-pass, low-pass or bandpass characteristics depending on the processing frequency. For example, a high-pass characteristic may be included if the processing frequency comprises an intermediate frequency band that does not include zero frequency (DC). The filtered signals are then sampled and analog-to-digital converted using ADC units 209a-b. Other arrangements may be used to sample and digitize the signal while preserving the complex vector nature of the signals.

The transmitter chain generates transmission signals, and includes a transmit signal generator 356, a transmitter modulator 270, a power amplifier (PA) 280, and a transmit filter 290. Transmit signal generator 356 generates a quadrature baseband or (I,Q) representation of the desired data-modulated signal. Other representations such as polar (r,θ) or pseudo-polar may alternatively be used. The transmit signal generator 356 sends the modulating signals (I, Q) or (r,θ) to the transmit modulator 270. The signals may be converted to analog signals either upon output from transmit signal generator 356 or upon input to transmitter modulator 270, by digital-to-analog converters (not shown). Transmitter modulator 270 generates the transmit center frequency upon which the desired modulation is impressed. The modulated transmit frequency signal is then amplified to a transmit power level by PA 280, the amplified output of which is connected to the antenna through transmit filter 290. Transmit filter 290 suppresses noise at the receive frequency and also prevents received signals being absorbed by the transmitter. Receive filter 201 and transmit filter 290 may be combined into a transmit-receive duplexer 101, such as shown in FIG. 2.

Digital processor 350 processes the sampled signal of interest to reduce interference due to own-transmitter interference based on estimated distortion signal samples derived from the data-modulated signal output by the transmit signal generator 356. In one embodiment, digital processor 350 comprises sample memory 352, non-linear function 354, transmit signal generator 356, transform units 360a-b (e.g., discrete Fourier transform (DFT) units), and compensation unit 370. Non-linear function 354, sample memory 352, DFT units 360a-b, and compensator 370 are all digital elements, which may therefore be implemented in one or more programmable digital signal processors (DSPs). The most intensive computations are performed by the DFT units 360a-b. Thus, OFDM systems typically complement programmable signal processors with an optimized hardware realization of a Fast Fourier Transform to reduce power consumption.

Sample memory 352, which serves as a serial-to-parallel converter, collects the digital samples for both the signal interest and the estimated distortion signal. The digital samples for the signal of interest may also be subjected to a digital frequency-shift, if necessary, either before sample memory 352 or at some point in the processing, to center the band occupied by the signals at a desired frequency, such as DC. In the latter case the signal of interest samples are said to occupy the quadrature baseband.

DFT units 360a-b divide the sampled input signals into equal-sized and equal-spaced frequency channels. The signal of interest samples output by ADC converters 209a, 209b and collected by sample memory 352 are denoted I1, Q1, and are divided into frequency channels by DFT unit 360a to yield complex values of the desired signal plus interference for the k=(1, 2, . . . , K) individual OFDM frequency channels. Estimated distortion signal samples input to sample memory 352 are denoted by I2. The estimated distortion signal samples only include real values, and therefore, do not contain a corresponding source of quadrature values. A block of values I2, Q2 of the same size as the block of I1, Q1 values is assembled and divided in to frequency channels by DFT unit 360b to yield estimated distortion signal samples for each of the k=(1, 2, . . . , K) OFDM frequency channels. Because the estimated distortion signal samples do not include any quadrature values (i.e., Q=0), the quadrature input to DFT unit 360b is connected to ground or otherwise set to zero.

Transmit signals that are incompletely suppressed by filters 201 and optional filter 203 may cause non-linear effects either in LNA 202, mixers 204a-b, or both. Typically, the non-linear effects cause the square of amplitude modulation on the transmit signal to transfer to the receiver local oscillator leakage, and thus to the output of mixers 204a-b. If the square of the amplitude modulation has frequency components in the processing frequency bandwidth, it will interfere with the desired signal. Thus, non-linear function 354 processes the transmit modulation signals in the digital domain to mimic the generation of the processing-band interference. Typically non-linear function 354 computes the square amplitude $I^2+Q^2$ (or $r^2$ in the case of polar modulation), and applies a digital filter that approximately matches the filtering provided by filters 207a-b and 208a-b. If signals are frequency shifted, then the output of non-linear function 354 may also be frequency shifted. The resulting samples form an estimate of the own transmitter-interference with an as-yet unknown scaling and phase shift relative to the true interference present in the desired signal samples. The estimated distortion signal samples are collected in sample memory 352 over the period of an OFDM symbol block and the block of samples are submitted to DFT unit 360b to resolve the total distortion signal estimate into OFDM frequency channel specific distortion signal estimates.

Compensator 370 processes the complex values from the corresponding frequency channels output by DFT units 360a-b to reduce interference from the desired signal. Simply expressed, compensator 370 correlates the signal of interest samples for every frequency channel output by DFT unit 360a with the sampled distortion signal for the same frequency channel output from DFT unit 360b to determine a complex scaling factor C(k) that may used in multiplication with the value from DFT unit 360b to obtain a compensating value to subtract from the value output by DFT unit 360a. In order to derive the function that compensator 370 performs, it is helpful to bear in minds the following assumptions:

(1) The non-linear interference mechanisms in mixers 204a-b are substantially identical for a given frequency channel, but may vary across the frequency band.

(2) Mismatches in the linear filters 207a, 208a and 207b, 208b may cause a slight difference in amplitude or phase, both of which may be described by a complex scaling factor Ci(k) for the In-Phase channel and Cq(k) for the Quadrature channel, where k is the frequency channel index.

(3) The non-linear interference estimator function 206 successfully mimics the non-linear interference mechanisms of mixers 204a-b, apart from a scaling factor and phase shift per frequency channel, which also describes any mismatch between the filter operations of the non-linear function 354 and filters 207a-b and 208a-b in the desired signal path. The scaling factors may be absorbed into Ci(k),Cq(k), which thus describe the complex scaling of the interference estimate per frequency channel used to match the own-transmitter interference present in the desired signal.

Frequency channel k of signal I1 includes an amount of transmitter leakage interference generally equal to Ci(k) times the frequency channel k of signal I2, and frequency channel k of signal Q1 includes an amount of transmitter leakage interference generally equal to Cq(k) times the frequency channel k of signal I2. The cosine and sine components of the real interference signal I2 in frequency channel k may be denoted by:

$$Ic(k)\cos(w_k t) + Is(k)\sin(w_k t) = 0.5(Ic(k) - jIs(k))e^{jwkt} + 0.5(Ic(k) + jIs(k))e^{-jwkt}. \quad (1)$$

Thus, $I2(k)$ may be seen to comprise a complex exponential at $+w_k$ of amplitude $(Ic(k)-jIs(k))/2$, and a complex exponential at $-w_k$ of amplitude $(Ic(k)+jIs(k))/2$. The former, $(Ic(k)-jIs(k))/2$, may be regarded as the amplitude $I2(k)$ of the complex exponential at $+w_k$, while the latter, $(Ic(k)+jIs(k))=I2(-k)$ may be regarded as the amplitude $I2(-k)$ of the complex exponential at the mirror frequency $-w_k$. Multiplying $I2(k)$ by the scaling factor Ci(k) gives an estimate of the value of the interference in $I1(k)$ at frequency $w_k$, taking into account mismatches, of $I1(k)=Ci(k)I2(k)$. Likewise there may be a component $I1(-k)=Ci(-k)I2(-k)$ at $-w_k$. For real signals, mirror image components are always complex conjugates of each other. Thus, $Ci(-k)=Ci^*(k)$ and $I1(-k)=Ci^*(k)I2(-k)$. Likewise the corresponding components of Q1 are:

$$Q1(k)=Cq(k)I2(k)$$

$$Q1(-k)=Cq(-k)I2(-k)=Cq(k)I2(-k) \quad (2)$$

At the output of DFT unit 360a, the frequency channels are resolved, with $(I3(k), Q3(k))$ being the result of applying $I1(k)$ to the I1 input and $Q1(k)$ to the Q input. DFT unit 360a regards the input (I1, Q1) as equal to I1+jQ1. The component at frequency $+w_k$ is thus:

$$(I3(k)+jQ3(k))=Ci(k)I2(k)+jCq(k)I2(k)=(Ci(k)+jCq(k))I2(k), \quad (3)$$

and the component at $-w_k$ is:

$$(I3(-k)+jQ3(-k))=Ci(-k)I2(-k)+jCq(-k)I2(-k)=(Ci(-k)+jCq(-k))I2(-k). \quad (4)$$

DFT unit 360b divides I2 into the same frequency channels, where the complex amount $I2(k)$ in the frequency channel associated with $+w_k$ at the DFT input is output as $(I4(k)+jQ4(k))$, and where I4 and Q4 are real values that respectively equal the real and imaginary parts of $I2(k)$. Thus, to reduce the interference present in $(I3(k),Q3(k))$, compensator 370 determines scaling factors Ci(k), Cq(k) that satisfy:

$$I3(k)+jQ3(k)=(Ci(k)+jCq(k))(I4(k)+jQ4(k)). \quad (5)$$

Letting Ci(k)+jCq(k)=a(k)+jb(k) where a and b are now real, it is desired to find C(k)=a(k)+jb(k) that satisfies:

$$I3(k)+jQ3(k)=C(k)(I4(k)+jQ4(k)). \quad (6)$$

In one embodiment, compensator 370 determines the complex factor C(k) by complex-correlating $(I3(k)+jQ3(k))$ with $(I4(k)+jQ4(k))$ over a sufficient number of OFDM symbol periods for the desired signal content of $I3(k)+jQ3(k)$ to average to near zero. That is:

$$C(k) = \frac{\text{Mean value of } \{(I4(k) - jQ4(k))(I3(k) + jQ3(k))\}}{\text{Mean value of } \{(I4(k) - jQ4(k))(I4(k) + jQ4(k))\}}, \quad (7)$$

with a similar result for C(-k).

The above shows that compensating for transmitter leakage impairments reduces to performing a complex correlation between signals in corresponding frequency channels output by DFT units 360a-b to determine the complex amount C(k) of (I4(K),Q4(K)) that should be subtracted from $(I3(k),Q3(k))$ in the same frequency channel. In so doing, compensator 370 produces an interference compensated desired signal output for OFDM frequency channel +k. The compensation process is performed for all frequency channels, i.e., those frequency channels with index +k and −k.

Note that C(k)=Ci(k)+jCq(k), and that Ci(−k)=Ci*(k) and Cq(−k)=Cq (k). Therefore, Ci(−k)=Ci*(k)+jCi*(k), which does not equal C*(k). Hence compensator 370 performs the correlation for the +k and −k frequency channels separately; no assumption about conjugate symmetry of the results may be made.

Figure 11:
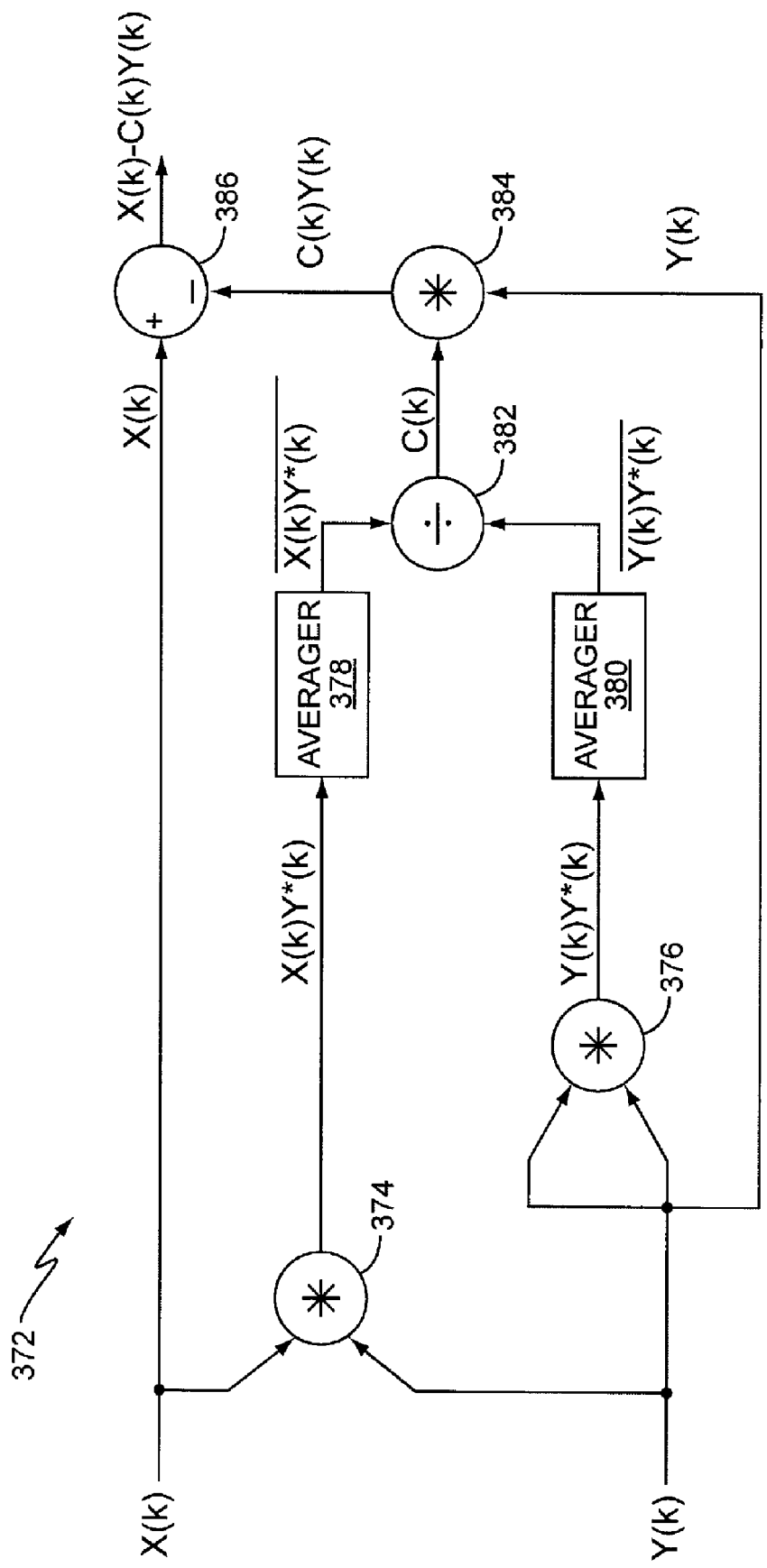
FIG. 11 illustrates one exemplary compensator according to the present invention.

FIG. 11 illustrates a block diagram for an exemplary compensation unit 372 for compensator 370. For simplicity, FIG. 11 shows the compensator 370 in terms of one compensation unit 372 for one frequency channel k. It will be appreciated that compensator 370 may implement the compensator function for each OFDM frequency channel by including a separate interference compensation unit 372 for each frequency channel in the interference compensator 370. In another embodiment, compensator 370 may include a single interference compensation unit 372, where software is used to serially pass the signal of interest samples and estimated distortion signal samples for each frequency channel through the interference compensation unit 372. In still another embodiment, compensator 370 may use a combination of software and multiple interference compensation units 372 to execute the interference compensation function for each frequency channel.

Compensation unit 372 comprises cross-correlator 374, auto-correlator 376, averaging units 378 and 380, divider 382, complex multiplier 384, and combiner 386. The sampled signal of interest for frequency channel k output by DFT unit 360a is represented as complex value X(k), and the sampled distortion signal estimate for frequency channel k output by DFT unit 360b is represented as complex value Y(k). Cross-correlator 374 cross-correlates X(k) with Y(k) by multiplying X(k) by the complex conjugate of Y(k). Auto-correlator 376 likewise correlates Y(k) with itself by multiplying Y(k) by its complex conjugate. The outputs of correlators 374 and 376 are averaged separately over a large number of OFDM symbol periods in averaging units 378 and 380, respectively. Averaging units 378 and 380 may average the correlator outputs over a rectangular block moving window. Alternatively, the averaging units 378 and 380 may employ exponential forgetting. Both of these averaging options are well known and involve only updating the current average using the new values.

Divider 382 divides the average cross-correlation output by averaging unit 378 by the average auto-correlation output by averaging unit 380, the latter being a real quantity, to produce an output that represents the complex correlation of X(k) with Y(k), represented herein as scaling factor C(k). Multiplier 384 scales the estimated distortion signal samples Y(k) by multiplying it by the complex correlation value C(k) output by divider 382. Combiner 386 subtracts the scaled distortion signal samples from X(k) to give the interference-compensated OFDM signal for that frequency channel.

The function of FIG. 11 is repeated for all wanted signal OFDM frequency channel values to produce a set of compensated OFDM frequency channel values for decoding user data. By separately compensating for transmitter leakage interference in each frequency channel value using a separate complex scaling factor, mismatches in filters or delay differences between the interference estimate waveform and the actual interference in the desired signal paths are compensated. A delay is equivalent to a phase shift that increases or decreases with frequency, and so may be compensated by a progressive phase shift evident in the scaling factors produced by the correlators.

Figure 12:
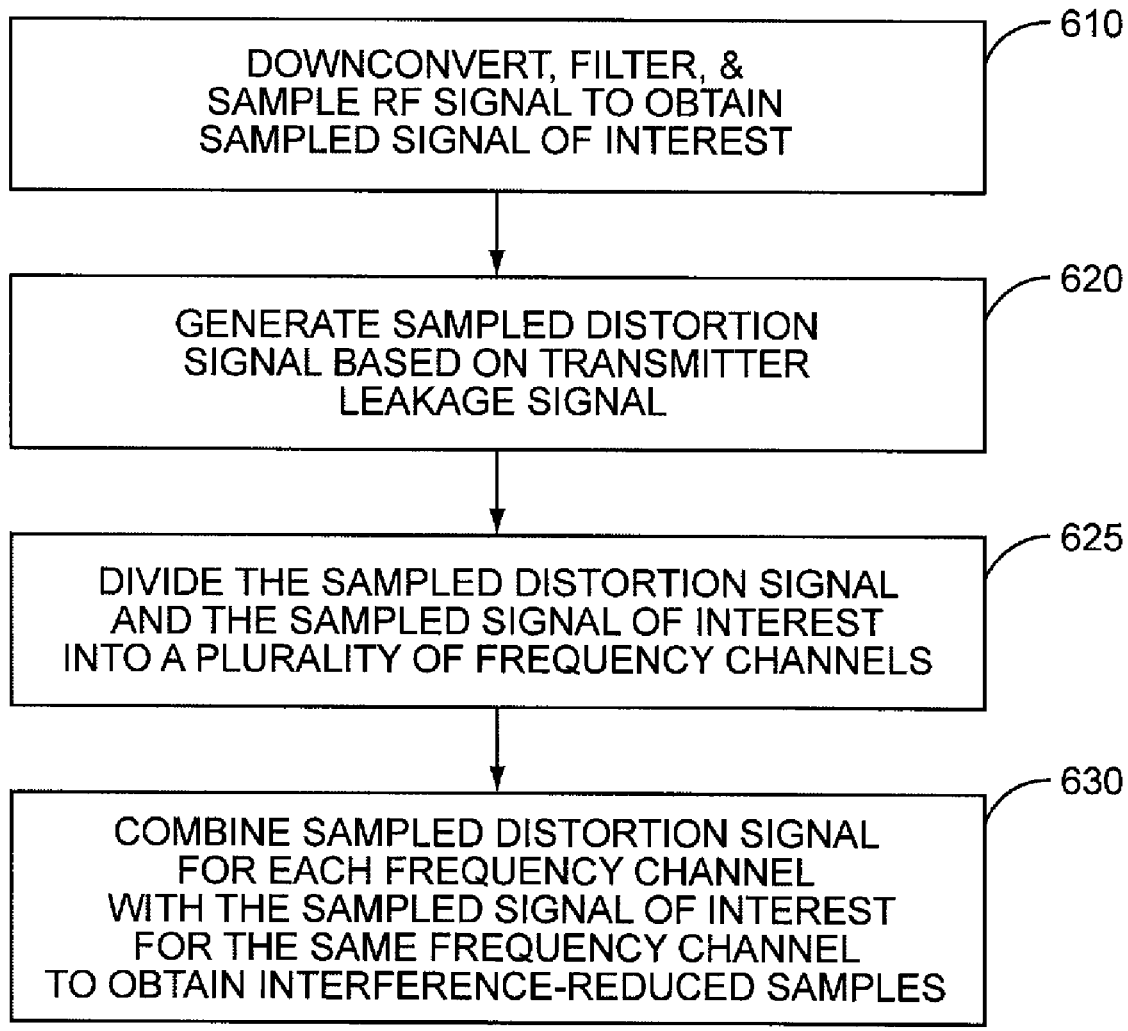
FIG. 12 illustrates an exemplary method for reducing interference form transmitter leakage in a wideband radio transceiver.

FIG. 12 illustrates an exemplary method for reducing own-transmitter interference in OFDM or other wideband systems. Those skilled in the art will recognize that the method illustrated in FIG. 12 may be implemented using various embodiments of the transceiver circuits described above. In FIG. 12, blocks 610 and 620 are generally the same as those in FIG. 6. More particularly, the received signal is downconverted, filtered and sampled at block 610 to generate a sampled signal of interest. At block 620, a sampled distortion signal is generated based on the transmitter leakage signal. Both the sampled distortion signal and the sampled signal of interest are divided into a plurality of frequency channels at block 625. Interference-reduced signal samples for each frequency channel are obtained at block 630 by combining the sampled distortion signal for each frequency channel with the sampled signal of interest for the same frequency channel, as shown by FIG. 11. Those skilled in the art will appreciate that the implementation of blocks 620 may be accomplished using any of the above-described embodiments, e.g., the embodiments shown in FIGS. 7 and 8.

In summary, using per-frequency channel interference compensation, a distortion estimation function produces an estimated distortion waveform by processing the transmit modulation waveform through a non-linear operation. The transmit waveform is already available in the digital domain, so the non-linear operation may be implemented in the digital domain. The result of the non-linear operation is collected over a received OFDM block interval in memory, and then submitted to the same kind of Discrete Fourier Transform as the signal of interest samples to produce frequency channel specific interference estimates. The frequency channel specific interference estimates are complex-correlated with the signal of interest samples for the same frequency channel over many OFDM symbol periods to determine an amount of interference contained in each desired signal in each frequency channel. The interference estimate for each frequency channel is scaled based on the determined amount of interference for the same frequency channel, and then subtracted from the corresponding signal of interest samples for the same frequency channel to produce interference-reduced desired signal samples for each frequency channel for data decoding.

Thus, the present invention reduces non-linear, own-transmitter interference effects in a wideband OFDM homodyne, low-IF, or conventional receivers, thereby facilitating the potential omission of extra filter 203 and/or the reduction of power consumption in the receiver circuits while maintaining an acceptably low level of own-transmitter interference. Such benefits may be important in designing low-cost, low-power receivers for battery operated handheld wireless devices.

Although the above describes generating and applying a scaling factor for each frequency channel, the present invention is not limited to this implementation. The present invention generally applies to a selected number of frequency channels, where the selected number may comprise all of the plurality of frequency channels or some subset of the plurality of frequency channels. In some embodiments, scaling factors are generated and applied to only a selected subset of frequency channels, e.g., the low frequency channels. In other embodiments, computational savings may be achieved by exploiting similarities associated with neighboring frequency channels. For example, compensator 370 may assume that the scaling factors for two or more adjacent frequency channels are essentially equivalent. Thus, to save computing power, the compensator 370 may determine a scaling factor for a selected number of frequency channels less than the total number of frequency channels, and may reuse the determined scaling factor for the remaining frequency channels. For example, compensator 370 may determine a new scaling factor for every fourth frequency channel. Thus, frequency channels one, two, and three may all use the scaling factor determined for frequency channel one. Alternatively, frequency channels one, two, and three may all use an average scaling factor obtained by averaging some number of determined scaling factors, e.g., the first and fourth scaling factors. It will be appreciated that any combination of the above-described embodiments may also be used to implement the present invention.

The invention described herein anticipates that own-transmitter interference might depend on whether the receiver is a homodyne receiver, which strictly only applies for that OFDM frequency channel value that mixes down to an intermediate frequency of zero, or alternatively is a so-called low-IF receiver in which the signal mixes down in the quadrature downconverter to an intermediate frequency that is not zero, but that is less than the total RF bandwidth, or yet again a high-IF receiver in which the signal mixes down to an IF greater than the total RF bandwidth imposed by antenna and inter-stage filters. Indeed, different frequency channels of the OFDM signal may fall into different ones of the categories of homodyne, low-IF or high-IF, which the invention handles by using a separate compensating calculation adapted to each OFDM frequency channel. The invention may thus be applied to cases where the quadrature downconverter 204 converts all wanted OFDM frequency channels to frequencies on the positive side of zero, or alternatively all on the negative side of zero frequency, or with some on both sides, straddling zero frequency.

Those skilled in the art will appreciate that several of the processing steps discussed above may be performed with one or more general-purpose or special-purpose microprocessors, microcontrollers, or digital signal processing units. Thus, several of the circuits pictured in FIGS. 1-5, 10, and 11, such as the interference subtraction circuit 140, complex multiplier circuit 220, phase rotation generator 230, modulation waveform generator 260, correlator circuits 311, subtraction circuits 310, complex multipliers 312, sample memory 352, DFT units 360a-b, compensator 370, digital non-linear function 406, digital filters 407c, 408c, 520a-b, 542, 544, and 546 may be implemented with programmable processing units, with hardware logic circuits, or a combination of both. One or more of these circuits may be implemented on an application-specific integrated circuit (ASIC) along with one or more additional circuits pictured in FIGS. 1-5, 10, and 11. Further, any of these circuits may be combined with one or more processors and/or hardware configured to control the transceiver circuitry and/or to implement a wireless protocol stack according to one or more wireless standards.

Of course, the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A radio transceiver, comprising:
    a receiver unit configured to downconvert, filter, and sample a radio frequency signal comprising a desired signal and a transmitter leakage signal to obtain a sampled signal of interest;
    a distortion estimation unit configured to generate a sampled distortion signal estimate of one or more distortion products of the transmitter leakage signal;
    first and second transform units to divide the sampled signal of interest and the sampled distortion signal estimate, respectively, into a plurality of frequency channels; and
    an interference subtraction unit configured to combine the sampled distortion signal estimate for each of a selected number of frequency channels with the corresponding sampled signal of interest for each of the same frequency channels to obtain interference-reduced signal samples for each of said selected number of frequency channels.

2. The radio transceiver of claim 1, wherein the receiver comprises one of a homodyne downconverter and an intermediate frequency downconverter for downconverting the radio frequency signal.

3. The radio transceiver of claim 1, wherein the transmitter leakage signal has a modulation bandwidth, and wherein the receiver unit is configured to downconvert the radio frequency signal to an intermediate frequency less than the modulation bandwidth of the transmitter leakage signal.

4. The radio transceiver of claim 1, wherein the distortion estimation unit comprises one or more analog non-linear components configured to produce estimates of non-linear products of the transmitter leakage from a transmitter signal and an analog-to-digital converter to produce the sampled distortion signal estimate from the non-linear products.

5. The radio transceiver of claim 1, wherein the distortion estimation unit comprises a digital distortion processor configured to generate the sampled distortion signal estimate.

6. The radio transceiver of claim 1, wherein the distortion estimation unit further comprises one or more filters matched to one or more receive filters in the receiver unit.

7. The radio transceiver of claim 1, wherein the first and second transform units comprise first and second discrete Fourier transform units.

8. The radio transceiver of claim 1, wherein the interference subtraction unit comprises:
    a first correlator configured to correlate the sampled signal of interest for each of said selected number of frequency channels with the corresponding sampled distortion signal estimate for each of the same frequency channels to obtain a first factor for each of said selected number of frequency channels;
    a second correlator configured to correlate the sampled distortion signal estimate for each of said selected number of frequency channels with itself to obtain a second factor for each of said selected number of frequency channels;
    a scaling unit configured to scale the sampled distortion signal estimate for each of a second selected number of frequency channels based on the first and second factors; and
    a subtracting unit configured to subtract the scaled sampled distortion signal estimate for each of said second selected number of frequency channels from the corresponding sampled signal of interest for each of the same second selected number of frequency channels to obtain the interference-reduced signal samples for each of said second selected number of frequency channels.

9. The radio transceiver of claim 8, wherein the interference subtraction unit further comprises:
    a first averaging unit to average the first factor for each of said selected number of frequency channels over a plurality of OFDM symbol periods;
    a second averaging unit to average the second factor for each of said selected number of frequency channels over a plurality of OFDM symbol periods; and
    a divider to divide the averaged first and second factors generated for each of said selected number of frequency channels to generate a scaling factor for each of said selected number of frequency channels.

10. The radio transceiver of claim 9, wherein the selected number of frequency channels comprises all of the plurality of frequency channels, and wherein the second selected number of frequency channels equals the selected number of frequency channels.

11. The radio transceiver of claim 9, wherein the selected number of frequency channels comprises a subset of the plurality of frequency channels comprising fewer than the plurality of frequency channels.

12. The radio transceiver of claim 11, wherein the scaling unit is configured to scale the sampled distortion signal for each of the selected number of frequency channels using the scaling factor generated for each of the same frequency channels and to reuse the determined scaling factors to scale the sampled distortion signal for the remaining frequency channels.

13. A method for reducing interference from transmitter leakage in a radio transceiver, the method comprising:
    downconverting, filtering, and sampling a radio frequency signal comprising a desired signal and a transmitter leakage signal to obtain a sampled signal of interest;
    generating a sampled distortion signal estimate of one or more distortion products of the transmitter leakage signal;
    dividing each of the sampled signal of interest and the sampled distortion signal estimate into a plurality of frequency channels; and
    combining the sampled distortion signal estimate for each of a selected number of frequency channels with the corresponding sampled signal of interest for each of the same frequency channels to obtain interference-reduced signal samples for each of said selected number of frequency channels.

14. The method of claim 13, wherein downconverting, filtering, and sampling the radio frequency signal comprises downconverting the radio frequency signal to one of a baseband frequency and an intermediate frequency.

15. The method of claim 13, wherein downconverting, filtering, and sampling the radio frequency signal comprises downconverting the radio frequency signal to an intermediate frequency less than a modulation bandwidth of the transmitter leakage signal.

16. The method of claim 13, wherein generating the sampled distortion signal estimate comprises producing estimates of non-linear products of the transmitter leakage from a transmitter signal, using one or more analog non-linear components, and sampling the non-linear products to produce the sampled distortion signal estimate.

17. The method of claim 13, wherein generating the sampled distortion signal estimate comprises generating the sampled distortion signal estimate from a digital transmitter modulation signal.

18. The method of claim 13, further comprising filtering the sampled distortion signal estimate using one or more filters configured to match the response of one or more filters in the receiver circuit.

19. The method of claim 13, wherein dividing each of the sampled signal of interest and the sampled distortion signal estimate into a plurality of frequency channels comprises applying a discrete Fourier transform to each of the sampled signal of interest and the sampled distortion signal estimate.

20. The method of claim 13, wherein combining the sampled distortion signal estimate with the sampled signal of interest comprises:
   correlating the sampled signal of interest for each of said selected number of frequency channels with the corresponding sampled distortion signal estimate for each of the same frequency channels to obtain a first factor for each of said selected number of frequency channels;
   correlating the sampled distortion signal estimate for each of said selected number of frequency channels with itself to obtain a second factor for each frequency of said selected number of frequency channels;
   scaling the sampled distortion signal estimate for each of a second selected number of frequency channels based on the first and second factors; and
   subtracting the scaled sampled distortion signal estimate for each of said second selected number of frequency channels from the corresponding sampled signal of interest for each of the same second selected number of frequency channels to obtain the interference-reduced signal samples for each of said second selected number of frequency channels.

21. The method of claim 20, further comprising:
   averaging the first factor for each of said selected number of frequency channels over a plurality of OFDM symbol periods;
   averaging the second factor for each of said selected number of frequency channels over a plurality of OFDM symbol periods; and
   dividing the averaged first and second factors generated for each of said selected number of frequency channels to generate a scaling factor for each of said selected number of frequency channels.

22. The method of claim 21, wherein the selected number of frequency channels comprises all of the plurality of frequency channels, and wherein the second selected number of frequency channels equals the selected number of frequency channels.

23. The method of claim 21, wherein the selected number of frequency channels comprises a subset of the plurality of frequency channels comprising fewer than the plurality of frequency channels.

24. The method of claim 23, wherein scaling the sampled distortion signal comprises scaling the sampled distortion signal for each of the selected number of frequency channels using the scaling factor generated for each of the same frequency channels and reusing the determined scaling factors to scale the sampled distortion signal for the remaining frequency channels.

* * * * *

UNITED STATES PATENT AND TRADEMARK OFFICE
CERTIFICATE OF CORRECTION

PATENT NO. : 7,995,973 B2
APPLICATION NO. : 12/339726
DATED : August 9, 2011
INVENTOR(S) : Dent et al.

It is certified that error appears in the above-identified patent and that said Letters Patent is hereby corrected as shown below:

IN THE SPECIFICATIONS:

In Column 11, Line 61, delete "($I_{SOI}$, $Q_{SOI}$)" and insert -- ($I_{SOI}$, $Q_{SOI}$), --, therefor.

In Column 21, Line 30, in Equation (1), delete " $Ic(k)\cos(w_k t)+Is(k)\sin(w_k t)=0.5(Ic(k)-jIs(k))e^{jw_k t}+0.5(Ic(k)+jIs(k))e^{-jw_k t}$. " and insert -- $Ic(k)\cos(w_k t)+Is(k)\sin(w_k t)=0.5\big(Ic(k)-jIs(k)\big)e^{jw_k t}+0.5\big(Ic(k)+jIs(k)\big)e^{-jw_k t}$. --, therefor.

In Column 21, Line 50, in Equation (2), delete " $Q1(-k)=Cq(-k)I2(-k)=Cq(k)I2(-k)$ " and insert -- $Q1(-k)=Cq(-k)I2(-k)=Cq^*(k)I2(-k)$ --, therefor.

In Column 22, Line 32, delete " $Cq(-k)=Cq(k)$. " and insert -- $Cq(-k)=Cq^*(k)$. --, therefor.

Signed and Sealed this
Third Day of January, 2012

David J. Kappos
*Director of the United States Patent and Trademark Office*